US012695693B2

(12) United States Patent
Xie et al.

(10) Patent No.: US 12,695,693 B2
(45) Date of Patent: Jul. 28, 2026

(54) PACKET PROCESSING METHOD AND APPARATUS, AND DEVICE

(71) Applicant: Huawei Technologies Co., Ltd., Shenzhen (CN)

(72) Inventors: Jingrong Xie, Beijing (CN); Haibo Wang, Beijing (CN); Gang Yan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 178 days.

(21) Appl. No.: 18/663,207

(22) Filed: May 14, 2024

(65) Prior Publication Data

US 2024/0297844 A1 Sep. 5, 2024

Related U.S. Application Data

(63) Continuation of application No. PCT/CN2022/130827, filed on Nov. 9, 2022.

(30) Foreign Application Priority Data

Nov. 17, 2021 (CN) .......................... 202111367033.6

(51) Int. Cl.
*H04L 45/24* (2022.01)
*H04L 45/00* (2022.01)
(Continued)

(52) U.S. Cl.
CPC ............ *H04L 45/34* (2013.01); *H04L 45/741* (2013.01); *H04L 2212/00* (2013.01)

(58) Field of Classification Search
None
See application file for complete search history.

(56) References Cited

U.S. PATENT DOCUMENTS 10,419,982 B1 * 9/2019 Gundavelli ....... H04W 36/0033
2018/0375763 A1 * 12/2018 Brissette ................. H04L 45/24
(Continued)

FOREIGN PATENT DOCUMENTS

CN 105871721 A 8/2016
CN 109561021 A 4/2019
(Continued)

OTHER PUBLICATIONS

C. Filsfils, Ed et al:"SRv6 NET-PGM extension: Insertion draft-filsfils-spring-srv6-net-pgm-insertion-05." Jul. 6, 2021, 12 pages.
(Continued)

*Primary Examiner* — Christopher B Robinson
(74) *Attorney, Agent, or Firm* — Conley Rose, P.C.

(57) ABSTRACT

A packet processing method includes a second device that sends a first packet to a first device, where the first packet includes a first segment routing header (SRH). After receiving the first packet, the first device determines whether the first packet includes a first segment identifier. When the first packet includes the first segment identifier, the first device deletes the first SRH, performs an encapsulation operation to generate a second packet, and forwards the second packet. That is, when a function or an indication corresponding to the first segment identifier is to perform the encapsulation operation, after receiving the first packet, the first device may delete the first SRH in the first packet based on an actual case, and perform the encapsulation operation to generate the second packet, where the second packet does not include the first SRH.

20 Claims, 10 Drawing Sheets

(51) Int. Cl.
    *H04L 45/74*         (2022.01)
    *H04L 45/741*       (2022.01)

(56)               References Cited

U.S. PATENT DOCUMENTS

| | | |
|---|---|---|
| 2019/0104058 A1 | 4/2019 | Filsfils et al. |
| 2019/0238448 A1* | 8/2019 | Pignataro ................ H04L 45/12 |
| 2019/0394211 A1* | 12/2019 | Filsfils .................... H04L 63/12 |
| 2020/0007446 A1* | 1/2020 | Nainar ................. H04L 69/325 |
| 2020/0099610 A1* | 3/2020 | Heron ..................... H04L 45/04 |
| 2020/0127913 A1* | 4/2020 | Filsfils ................. H04L 45/741 |
| 2020/0228446 A1* | 7/2020 | Geng .................... H04L 45/243 |
| 2021/0083973 A1 | 3/2021 | Peng et al. |
| 2022/0182326 A1* | 6/2022 | Gamage ................. H04L 45/26 |

FOREIGN PATENT DOCUMENTS

| | | | | |
|---|---|---|---|---|
| CN | 110557329 A | 12/2019 | | |
| CN | 112787927 A | 5/2021 | | |
| WO | WO-2019005949 A1 * | 1/2019 | .......... | H04L 45/507 |
| WO | WO-2020048493 A1 * | 3/2020 | ............ | H04L 45/34 |

OTHER PUBLICATIONS

S. Deering et al:"RFC 8200: Internet Protocol, Version 6 (IPv6) Specification." Internet Engineering Task Force (IETF), Jul. 2017, 42 pages.
C. Filsfils, Ed. et al:"RFC 8986: Segment Routing over IPv6 (SRv6) Network Programming." Internet Engineering Task Force (IETF), Feb. 2021, 34 pages.

* cited by examiner

1000

1100

PACKET PROCESSING METHOD AND APPARATUS, AND DEVICE

CROSS-REFERENCE TO RELATED APPLICATIONS

This is a continuation of International Patent Application No. PCT/CN2022/130827 filed on Nov. 9, 2022, which claims priority to Chinese Patent Application No. 202111367033.6 filed on Nov. 17, 2021. The disclosures of the aforementioned applications are hereby incorporated by reference in their entireties.

TECHNICAL FIELD

This application relates to the field of communication technologies, and in particular, to a packet processing method and apparatus, and a device.

BACKGROUND

Segment routing (SR) is a protocol designed based on a source routing concept to forward a data packet on a network, and supports explicit specification of a forwarding path of a data packet on a source node. When being deployed on an Internet Protocol (IP) version 6 (IPv6) data plane, the SR is referred to as Segment Routing over IPv6 (SRv6). In application of the SRv6, forwarding path information is carried in a segment routing header (SRH) that includes a segment identifier (SID) list. The SID list includes a plurality of sequentially arranged SIDs which respectively represent a plurality of segments, and each segment is an instruction or an instruction set for processing a packet. The SRH is encapsulated in the packet, and a processing process in which an SR network processes the packet is carried in the segment identifier list of the SRH.

A length of each SID on an SRv6 network is 128 bits. In this case, each time one SID is added to the SID list, a length of the SRH increases by 128 bits, and a length of the packet also increases by 128 bits. In one aspect, a large amount of network resources is occupied during packet forwarding due to an increase in the length of the packet, resulting in low bandwidth utilization of a network link. In another aspect, an excessively long length of the SRH increases difficulty of processing the packet, making it difficult for an existing device to effectively process the SRH. To reduce transmission pressure on a network node, a flavor is added to the SID, to change a forwarding behavior of a node indicated by the SID. A flavor supported by the SRv6 SID may include a penultimate endpoint node performs an SRH removal operation (or penultimate segment pop of the SRH (PSP). To reduce a burden of an egress of the SRv6 network, the SRH can be removed at the penultimate endpoint node. The egress does not need to check SRH information, and only needs to look up a local SID table based on a destination IPv6 address.

However, a related communication standard specifies that the PSP operation is supported for only a SID of a specific type, for example, a SID of an End, End. X, or End. T type, and the PSP operation cannot be implemented for a SID of another type. As a result, packet transmission overheads are high, affecting transmission efficiency.

SUMMARY

This application provides a packet processing method and apparatus, and a device, to resolve a problem that efficiency of SRv6 packet transmission is affected due to existence of an SRH.

According to a first aspect of this application, a packet processing method is provided. The method may include a first device receives a first packet sent by a second device, where the first packet includes a first SRH. The first SRH may include one or more segment identifiers, and the one or more segment identifiers indicate a segment for transmitting the first packet. After receiving the first packet, the first device determines whether the first packet includes a first segment identifier, where the first segment identifier is a segment identifier corresponding to the first device. If the first packet includes the first segment identifier, it indicates that the first packet is a packet sent to the first device, and the first device deletes the first SRH in the first packet, and performs an encapsulation operation to generate a second packet. The first device forwards the second packet based on a destination address in the second packet.

In this implementation, after receiving the first packet, the first device may delete the first SRH in the first packet based on an actual case, and perform an encapsulation operation to generate the second packet. The second packet does not include the first SRH, so that a bandwidth occupied for transmitting the second packet is reduced, and efficiency of packet transmission is improved. In other words, in embodiments of this application, when the first device needs to perform the encapsulation operation, a function of deleting an SRH on demand may be configured, to reduce occupied bandwidth resources.

In a specific implementation, that the first device performs, in response to determining that the first packet includes the first segment identifier, an operation of deleting the first SRH on the first packet, and performs the encapsulation operation to generate the second packet includes the following. The first device determines that segment left (SL) in the first SRH is equal to 1 or updated SL is equal to 0. In response to determining that the first packet includes the first segment identifier and that the SL is equal to 1 or the updated SL is equal to 0, the first device performs the operation of deleting the first SRH on the first packet, and performs the encapsulation operation to generate the second packet. In this implementation, when the first device determines that the SL before updating is equal to 1 or the updated SL is equal to 0, it indicates that the first segment identifier is a penultimate segment identifier in the SRH. After the last segment identifier is read from the first SRH, a subsequent forwarding device no longer uses the first SRH, and the first device deletes the first SRH in the first packet, to reduce occupied bandwidth resources in a subsequent transmission process.

In a specific implementation, a type of the first segment identifier is a binding segment identifier.

In a specific implementation, the first segment identifier is a segment identifier of an endpoint bound to an SRv6 policy End.B6 type, or a segment identifier of an endpoint bound to an SR-Multiprotocol Label Switching (MPLS) policy End.BM type.

In a specific implementation, the first segment identifier is a segment identifier of an endpoint bound to an SRv6 policy delete on demand End.B6.Dod type, or a segment identifier of an endpoint bound to an SR-MPLS policy delete on demand End.BM.Dod type.

In a specific implementation, that the first device performs an operation of deleting the first SRH on the first packet, and performs the encapsulation operation to generate the second packet includes the following. The first device deletes the first SRH in the first packet, and encapsulates a first packet header into the first packet to generate the second packet. In this implementation, when deleting the first SRH, the first device may encapsulate the first packet header into an outer layer of the first packet, to execute a transmission path of the second packet through the newly encapsulated first packet header.

In a specific implementation, the first packet header is an IPv6 basic header, an IPv6 header including a second SRH, or an MPLS header. In this implementation, the first device may determine, based on an actual application, a type of the encapsulated first packet header, for example, encapsulate the IPv6 basic header, or encapsulate the IPv6 header including the second SRH, where the second SRH may include one or more segment identifiers, and the one or more segment identifiers indicate a segment for transmitting the second packet, or encapsulate the MPLS header.

In a specific implementation, the first packet header includes path information, and the path information indicates a transmission path of the second packet.

In a specific implementation, the path information corresponds to the first segment identifier.

In a specific implementation, the first SRH includes a second segment identifier, the second segment identifier indicates a next segment for transmitting the first packet, and the path information corresponds to the second segment identifier.

In a specific implementation, the second packet further includes a second packet header, and a destination address in the second packet header is the second segment identifier.

In a specific implementation, a segment identifier list in the second SRH includes the path information, or a label stack of the MPLS header includes the path information.

In a specific implementation, the second device is a host, and a payload of the first packet is a packet generated by the second device, or the second device is a forwarding device, and a payload of the first packet is a packet received by the second device.

In a specific implementation, a device connected to a device that generates the first packet when the device accesses a network and a device connected to a device that finally receives the first packet when the device accesses the network belong to different network domains.

In a specific implementation, the method further includes the following. The first device sends the first segment identifier and indication information to the second device, where the indication information indicates that the first device has a capability of performing an SRH deletion operation. In this implementation, the first device may release a segment identifier of the first device and the indication information to the second device, to indicate, through the indication information, that the first device has an SRH deletion capability. Further, the first device may directly release the first segment identifier and the indication information to the second device, or the first device releases the first segment identifier and the indication information to the second device through a controller.

The indication information is included in a function part of the first segment identifier, or the indication information is a flavor corresponding to the first segment identifier.

According to a second aspect of this application, a segment identifier releasing method is provided. The method includes the following. A first device obtains a first segment identifier, where the first segment identifier corresponds to the first device, and the first segment identifier indicates that the first device has a capability of performing an SRH deletion operation. The first device sends the first segment identifier to a second device. After receiving the first segment identifier, the second device may encapsulate the first segment identifier into a corresponding packet, so that when the packet can be forwarded to the first device, the first device deletes an SRH in the packet based on an indication of the first segment identifier.

In a specific implementation, the method further includes the following. The first device sends indication information corresponding to the first segment identifier to the second device, where the indication information indicates that a segment corresponding to a third segment identifier has a capability of performing an SRH deletion operation.

In a specific implementation, the indication information is included in a function part of the first segment identifier, or the indication information is a flavor corresponding to the first segment identifier, or the indication information is a part of the first segment identifier.

In a specific implementation, the first device may directly send the first segment identifier generated by the first device to the second device, or may send the first segment identifier to the second device through the controller.

In a specific implementation, the first segment identifier is a segment identifier of an End.B6 type or a segment identifier of an End.BM type.

In a specific implementation, the first segment identifier is a segment identifier of an End.B6.Dod type, or a segment identifier of an End.BM.Dod type.

According to a third aspect of this application, a packet processing apparatus is provided. The apparatus is used in a first device, and includes a receiving unit configured to receive a first packet sent by a second device, where the first packet includes a first SRH, a determining unit configured to determine that the first packet includes a first segment identifier, where the first segment identifier is a segment identifier corresponding to the first device, a generation unit configured to perform, in response to determining that the first packet includes the first segment identifier, an operation of deleting the first SRH on the first packet, and perform an encapsulation operation to generate a second packet, and a sending unit configured to send the second packet.

In a specific implementation, the generation unit is further configured to determine that SL in the first SRH is equal to 1 or updated SL is equal to 0, and perform, in response to determining that the first packet includes the first segment identifier and that the SL is equal to 1 or the updated SL is equal to 0, the operation of deleting the first SRH on the first packet, and perform the encapsulation operation to generate the second packet.

In a specific implementation, a type of the first segment identifier is a binding segment identifier.

In a specific implementation, the first segment identifier is a segment identifier of an endpoint bound to an SRv6 policy End.B6 type, or a segment identifier of an endpoint bound to an SR-MPLS policy End.BM type.

In a specific implementation, the first segment identifier is a segment identifier of an endpoint bound to an SRv6 policy delete on demand End.B6.Dod type, or a segment identifier of an endpoint bound to an SR-MPLS policy delete on demand End.BM.Dod type.

In a specific implementation, the generation unit is further configured to delete the first SRH in the first packet, and encapsulate a first packet header into the first packet to generate the second packet.

In a specific implementation, the first packet header is an IPv6 basic header, an IPv6 header including a second SRH, or an MPLS header.

In a specific implementation, the first packet header includes path information, and the path information indicates a transmission path of the second packet.

In a specific implementation, the path information corresponds to the first segment identifier.

In a specific implementation, the first SRH includes a second segment identifier, the second segment identifier indicates a next segment for transmitting the first packet, and the path information corresponds to the second segment identifier.

In a specific implementation, the second packet further includes a second packet header, and a destination address in the second packet header is the second segment identifier.

In a specific implementation, a segment identifier list in the second SRH includes the path information, or a label stack of the MPLS header includes the path information.

In a specific implementation, the second device is a host, and a payload of the first packet is a packet generated by the second device, or the second device is a forwarding device, and a payload of the first packet is a packet received by the second device.

In a specific implementation, a device connected to a device that generates the first packet when the device accesses a network and a device connected to a device that finally receives the first packet when the device accesses the network belong to different network domains.

In a specific implementation, the sending unit is further configured to send the first segment identifier and indication information to the second device, where the indication information indicates that the first device has a capability of performing an SRH deletion operation.

In a specific implementation, the indication information is included in a function part of the first segment identifier, or the indication information is a flavor corresponding to the first segment identifier.

According to a fourth aspect of this application, a segment identifier releasing apparatus is provided. The apparatus is used in a first device, and may include an obtaining unit configured to obtain a first segment identifier, where the first segment identifier corresponds to the first device and indicates that the first device has a capability of performing an SRH deletion operation, and a sending unit configured to send the first segment identifier to a second device, so that the second device encapsulates the first segment identifier into a corresponding packet.

In a specific implementation, the sending unit is further configured to send, to the second device, indication information corresponding to the first segment identifier, where the indication information indicates that a segment corresponding to the first segment identifier has a capability of performing an SRH deletion operation.

In a specific implementation, the indication information is included in a function part of the first segment identifier, or the indication information is a flavor corresponding to the first segment identifier, or the indication information is a part of the first segment identifier.

In a specific implementation, the sending unit is further configured to forward the first segment identifier to the second device through a controller.

In a specific implementation, the first segment identifier is a segment identifier of an End.B6 type or a segment identifier of an End.BM type.

In a specific implementation, the first segment identifier is a segment identifier of an End.B6. Dod type, or a segment identifier of an End.BM.Dod type.

According to a fifth aspect of this application, a packet processing system is provided. The system includes a first device and a second device. The second device is configured to send a first packet to a first device, where the first packet includes a first SRH. The first device is configured to perform the packet processing method according to the first aspect or any one of the implementations of the first aspect.

In a possible implementation, the first device may be further configured to perform the segment identifier releasing method according to the second aspect or any one of the implementations of the second aspect.

According to a sixth aspect of this application, a communication device is provided. The device includes a processor and a memory. The memory is configured to store instructions or a computer program. The processor is configured to execute the instructions or the computer program in the memory, to enable the communication device to perform the packet processing method according to the first aspect or any one of the implementations of the first aspect, or perform the segment identifier releasing method according to the second aspect or any one of the implementations of the second aspect.

According to a seventh aspect of this application, a computer-readable storage medium is provided, including instructions. When the instructions are run on a computer, the computer is enabled to perform the packet processing method according to the first aspect or any one of the implementations of the first aspect, or perform the segment identifier releasing method according to the second aspect or any one of the implementations of the second aspect.

According to an eighth aspect of this application, a chip is provided, including a memory and a processor. The memory is configured to store instructions or program code. The processor is configured to invoke the instructions or the program code from the memory and run the instructions or the program code, to perform the packet processing method according to the first aspect or any one of the implementations of the first aspect, or the processor performs the segment identifier releasing method according to the second aspect or any one of the implementations of the second aspect.

According to a ninth aspect of this application, a chip is provided. The chip includes a processor but does not include a memory. The processor is configured to read and execute instructions or program code stored in the memory outside the chip. When executing the instructions or the program code, the processor performs the packet processing method according to the first aspect or any one of the implementations of the first aspect, or the processor performs the segment identifier releasing method according to the second aspect or any one of the implementations of the second aspect.

According to the technical solution provided in this application, a second device sends a first packet to a first device, where the first packet includes a first SRH. After receiving the first packet sent by the second device, the first device determines whether the first packet includes a first segment identifier, where the first segment identifier is a segment identifier corresponding to the first device. When the first packet includes the first segment identifier, the first device performs an operation of deleting the first SRH on the first packet, and performs an encapsulation operation to generate a second packet, to forward the second packet. That is, when a function or an indication corresponding to the first segment identifier is to perform the encapsulation operation, after receiving the first packet, the first device may delete the first SRH in the first packet based on an actual case, and perform the encapsulation operation to generate the second packet, where the second packet does not include the first SRH, so that a bandwidth occupied for transmitting the second packet is reduced, and efficiency of packet transmission is improved. In other words, in this application, when the first device needs to perform the encapsulation operation, a function of deleting an SRH on demand may be configured, to reduce occupied bandwidth resources.

BRIEF DESCRIPTION OF DRAWINGS

To describe the technical solutions in some embodiments of this application more clearly, the following briefly describes the accompanying drawings used to describe some embodiments. It is clear that the accompanying drawings in the following descriptions are some embodiments of this application, and a person of ordinary skill in the art may still derive other drawings from these accompanying drawings without creative efforts.

DESCRIPTION OF EMBODIMENTS

Figure 1:
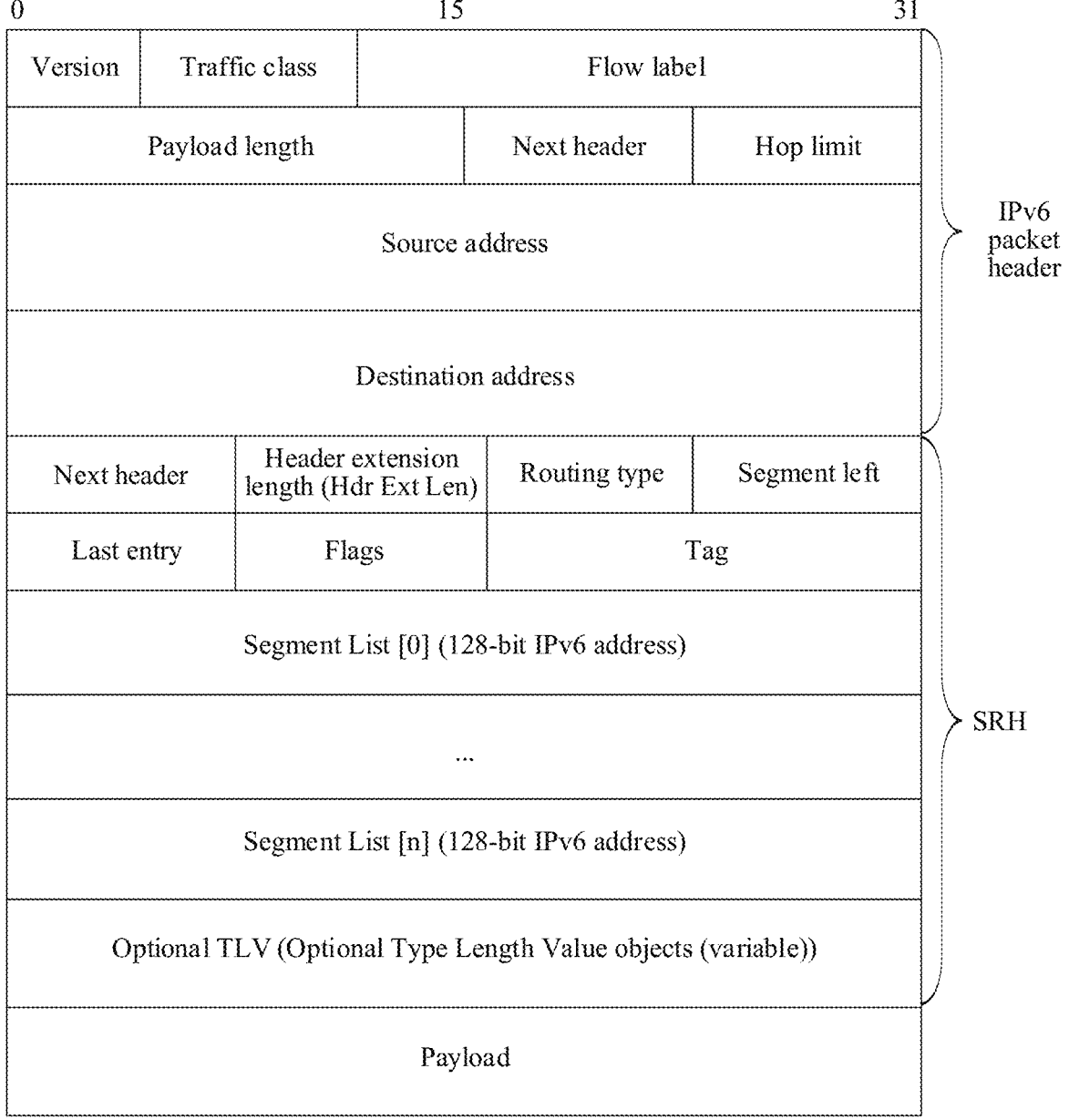
FIG. 1 is a schematic diagram of a format of an SRv6 packet.

To make a person skilled in the art understand the technical solutions in the present disclosure better, the following clearly describes the technical solutions in embodiments of the present disclosure with reference to the accompanying drawings in embodiments of the present disclosure. It is clear that the described embodiments are merely a part rather than all of embodiments of the present disclosure.

For ease of understanding of the technical solutions provided in embodiments of this application, technologies in the embodiments of this application are first described below.

On an SRv6 network, a packet processing process may be divided into several segments, and each segment is a specific processing behavior performed by a specific network device.

The several segments are separately executed by network devices on a packet forwarding path, to form the entire packet processing process. Each segment has a corresponding segment identifier, namely, a SID. On the SRv6 network, a network device inserts an SRH routing extension header into an IPv6 packet and adds SIDs of all segments that the packet passes through to the SRH, that is, a SID List, to explicitly specify a forwarding path of the packet.

Nodes on the SRv6 network are classified into three roles based on their functions: source node, transit node, and endpoint node. In this embodiment of this application, the network node and the network device have a same meaning, and each are a switch, a router, a virtual routing device, a virtual forwarding device, or another forwarding device. The source node is responsible for inserting an SRH extension header into an IPv6 header of an IPv6 packet, or adding an IPv6 header to a packet and inserting an SRH extension header. The node imports packet flows to the SRv6 path defined by segment list in an SRH. If the segment list includes only one SID and no information needs to be carried in the SRH, a destination address in the IPv6 header can be set to the SID, and no SRH needs to be inserted. Certainly, the SRH may also be inserted. If the segment list includes a plurality of SIDs, the SRH needs to be inserted. The source node may be a host that generates an SRv6 packet or an edge device in an SRv6 domain.

The transit node only performs common IPv6 packet forwarding on an SRv6 path, and does not participate in SRv6 processing. The transit node may be a node that supports SRv6 or a node that does not support SRv6.

The endpoint node performs SRv6 processing on a received SRv6 packet. An IPv6 destination address in the received SRv6 packet needs to be a SID configured on the endpoint node. The endpoint node needs to process the packet based on a SID indication and update the SRH.

SRv6 defines a plurality of types of SIDs. Different SIDs have different functions and indicate different forwarding actions. The SID defines a network function and represents a network indication. Forms of SRv6 SIDs use IPv6 addresses. For example, an End SID identifies a destination address prefix on a network. A forwarding action corresponding to the End SID is to decrease an SL value in the SRH by 1, obtain a next SID from the SRH based on the SL, update the SID to the destination address in the IPv6 packet header, look up a table based on the IPv6 destination address, and then forward the packet. An SID of an endpoint (endpoint with cross-connect to an array of layer-3 adjacencies (End.X)) cross-connected to an array of layer-3 (L3) adjacencies identifies a link on the network. A forwarding action corresponding to the End. X SID is to forward packets to a specific next hop based on a Layer 3 interface bound to the SID.

SID flavors may change forwarding behaviors of SRv6 SIDs to adapt to various service requirements. Supported SRv6 SID flavors include: ultimate segment pop of the SRH (USP), PSP, ultimate segment decapsulation (USD), and the like. To reduce a burden at an egress of the SRv6 network, the SRH can be removed at the penultimate endpoint node. The egress does not need to check SRH information, and only needs to look up a Local SID table based on a destination IPv6 address.

An SRv6 node maintains a Local SID table, to record the SRv6 SID generated by the node, operation instructions bound to the SRv6 SID, and forwarding information, such as a virtual private network (VPN) instance, an outbound interface, and a next hop. After receiving an SRv6 packet, the SRv6 node looks up the local SID table based on the SID in the packet and performs a forwarding action corresponding to the SID based on a result of looking up. An IPv6 SR packet encapsulation format is as follows. A new IPv6 basic header and SRH are added before an original data packet. For example, FIG. 1 is a schematic diagram of a format structure of an SRv6 packet. A packet header of the SRv6 packet includes an IPv6 packet header and an SRH. The IPv6 packet header includes a version field, a traffic type field, a flow label field, a payload length field, a next header field, a hop limit field, a source address field, and a destination address (DA) field. For a meaning of each field, refer to an explanation in a Request for Comments (RFC) 8200. The SRH includes a next header field, a header extension length (Hdr Ext Len) field, a routing type field, a segment left field, a last entry field, a flags field, a tag field, and a SID list. For a meaning of each field, refer to an explanation in RFC 8754. The SL field is also referred to as an SL pointer. In a packet forwarding process, the SL pointer sequentially points to elements in the SID list. In an example, with different SL values, a segment [SL] is used to represent each element in the SID list.

The SID list includes a plurality of sequentially arranged elements: a segment list [0] to a segment list [n], each element is one SID, and a length of each element is 128 bits. In addition, SIDs in the SID list may be arranged from back to front. The segment list [0] corresponds to the last executed segment, the segment list [1] corresponds to a penultimate executed segment, and so on.

As described above, the SRH includes the SL field. When the SRH is encapsulated in the packet, a head node of a forwarding path sets a value of the SL field to N minus 1 (N−1), where N is a quantity of SIDs included in the SID list. In the packet forwarding process, a network device corresponding to each SID in the SID list of the SRH, namely, an endpoint node on the forwarding path, sequentially subtracts 1 from the value of the SL field in the SRH of the packet, in other words, updates the value of the SL field, and copies the segment list [SL] to a DA field in an IPv6 header of the packet, in other words, updates content of the DA field.

Figure 2A:
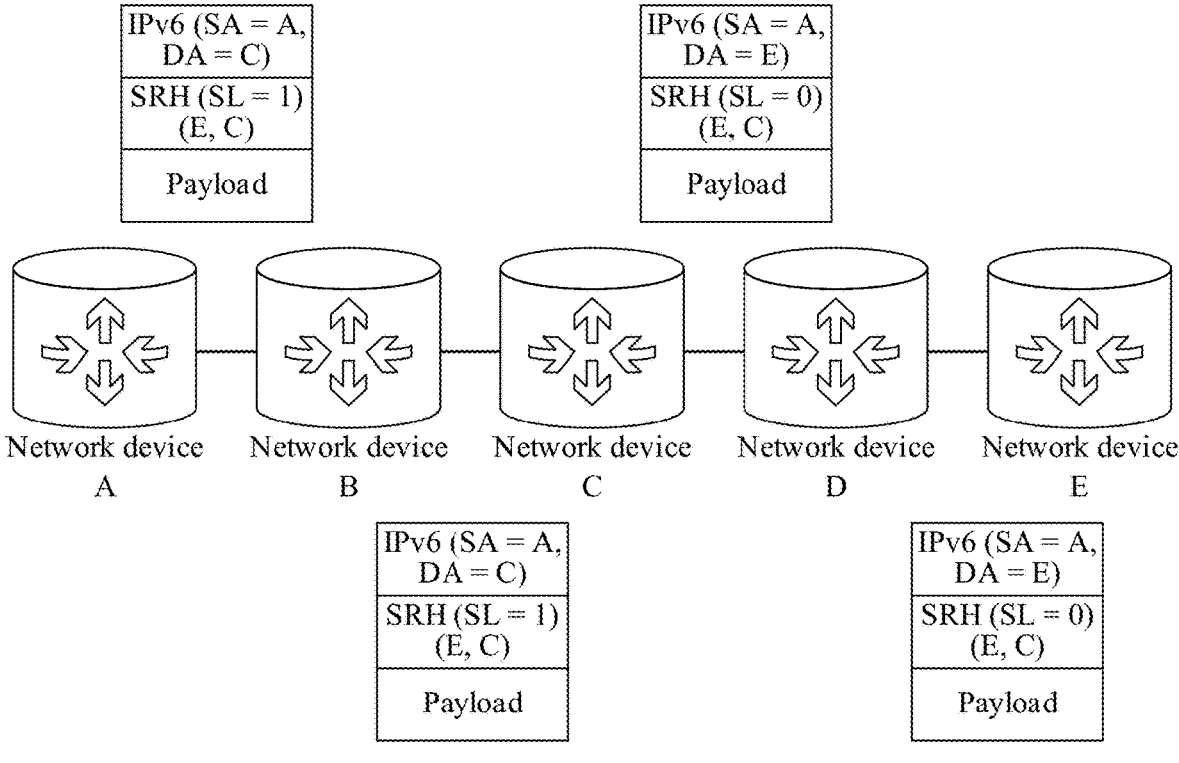
FIG. 2A is a schematic diagram of SRv6 packet transmission.

Refer to an application scenario shown in FIG. 2A. The application scenario includes an SRv6 network. The SRv6 network includes a network device A to a network device E. The network device A is a source node, and the network device E is a final destination node of a packet. A network device C and the network device E are endpoint nodes, and a network device B and a network device D are transit nodes. A process of forwarding packets over an SRv6 path is as follows.

(1) After receiving the packet, the source node A performs the following operations: encapsulating an SRH header, where because a path from the node A to the node E needs to pass through the node C and the node E, SL in the SRH is 2×1, that is, SL=1, and encapsulated SID list information is segment list [0]=E and segment list [1]=C, encapsulating an IPv6 basic header, where in the IPv6 basic header, a source address (SA) is an address on the node A, and a DA is an address indicated by the SL, that is, segment list [1] (an address of the node C) corresponding to SL=1, and searching a routing table based on the destination address in the encapsulated IPv6 header and forward the encapsulated packet to the node B.

(2) After receiving the packet, the node B looks up the routing table based on the destination address DA in the IPv6 header and forwards the packet to the node C.

(3) After receiving the packet, the node C performs the following operations: checking the SL value in the SRH header, where if the SL value is greater than 0, the SL value is decreased by 1, and the destination address DA is updated to the address indicated by the SL, that is, segment list [0] (an address of the node E) corresponding to SL=0, and searching the routing table based on the destination address DA in the IPv6 header and forward the packet to the node D.

(4) After receiving the packet, the node D looks up the routing table based on the destination address DA in the IPv6 header and forwards the packet to the node E.

(5) After receiving the packet, the egress node E checks the SL value in the SRH header and finds that the SL value is 0. Then, the egress node E decapsulates the packet, deletes the IPv6 basic header and SRH, and forwards the packet based on a destination address in the original packet.

In addition, when encapsulating the SRH header, the source node A may perform encapsulation in a reduced SRH manner. When the SRH header is encapsulated in the foregoing manner, the encapsulated SRH header does not include the first segment identifier. Further, the SRH header does not include the first SID (the node C), but includes the second SID (the node E). The SL in the SRH is still 1. After the packet arrives at the node C, the node C performs an operation of subtracting 1 from the packet, and updates the SL to 0.

It can be learned from the foregoing that a SID of an End type supports the PSP operation. Therefore, after receiving the packet, the node C may delete the SRH after updating the DA in the IPv6 packet header, so that when sending the packet to the node D, the packet does not need to carry the SRH, thereby reducing a waste of bandwidth resources.

However, when a segment identifier included in the SRH indicates to perform an encapsulation operation and the segment identifier is a penultimate segment identifier in the SRH, the PSP operation cannot be implemented. For example, the SRH includes a binding segment identifier (BSID), and the BSID is bound to a SID list to indicate a forwarding path. When receiving a valid BSID, a head node in an SR network performs a BSID-related operation. In an SRv6 network, a defined BSID-related operation may be inserting a new SRH header based on different BSID functions, or inserting a new outer IPv6 header including the SRH. The binding segment identifier may include a segment identifier of a type of endpoint bound to an SRv6 policy (End.B6) and a segment identifier of a type of endpoint bound to an SR-MPLS policy (End.BM). End.B6 may include a segment identifier of an End.B6.Encaps type and a segment identifier of an End.B6.Encaps.Red type.

Figure 2B:
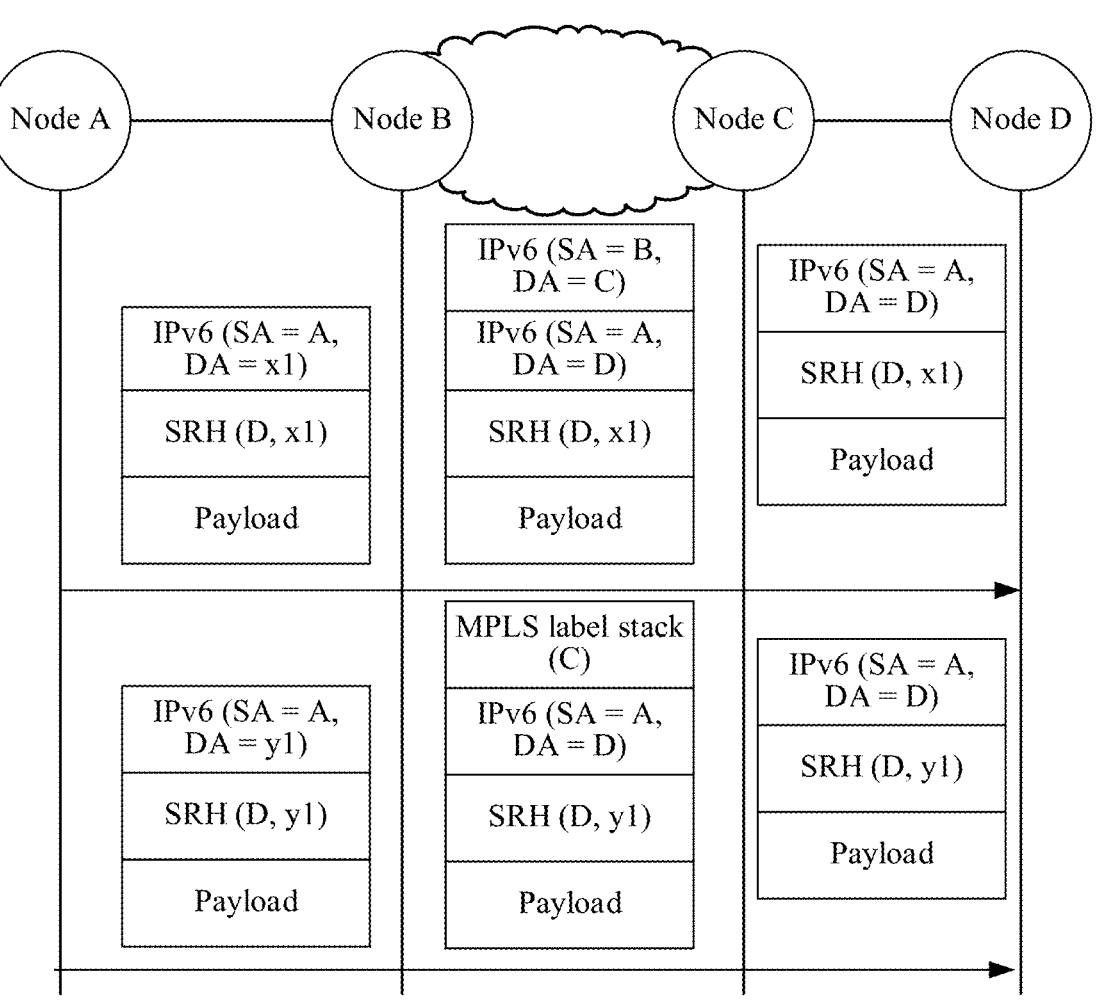
FIG. 2B is a schematic diagram of SRv6 packet transmission in an application scenario.

For example, in an example application scenario shown in FIG. 2B, when a binding segment identifier x1 of the End.B6.Encaps type is configured on a node B, an SRH of an SRv6 packet sent by a node A to the node B includes the segment identifier x1 and a next segment identifier D, that is, SRH (D, x1). The node B reads the next segment identifier D from the SRH, and updates a destination address in an original IPv6 packet header by using the segment identifier D. In addition, a routing table is looked up for path information (a next hop is a node C) for arriving at a device indicated by the segment identifier D based on the segment identifier D, a new IPv6 basic header (SA=B, DA=C) is encapsulated based on the found path information, and the packet is forwarded based on the new IPv6 packet header and sent to the node C. After receiving the packet whose destination address is C, the node C strips an outer IPv6 packet header, and forwards the packet based on an inner IPv6 packet header, where a destination address in the inner IPv6 packet header is D. It can be seen that SRH (D, x1) is always carried in the packet in the entire forwarding process.

It should be noted that when the node A encapsulates the SRH in the SRv6 packet in a reduced SRH manner, the SRH of the SRv6 packet sent by the node A to the node B does not include the segment identifier x1, but includes the segment identifier D, that is, SRH=(D), while the IPv6 basic header remains unchanged, where a source address SA=A, and a destination address DA=x1.

When a binding segment identifier y1 of the End.BM type is configured on the node B, after receiving the SRv6 packet sent by the node A, the node B reads the next segment identifier D from the SRH, and updates the destination address in the original IPv6 packet header by using the segment identifier D. In addition, the routing table is looked up for path information (the next hop is the node C) for reaching the device indicated by the segment identifier D based on the segment identifier D, an MPLS label stack is encapsulated based on the found path information, and the node C is specified in the MPLS label stack as a node of an MPLS path. The packet is forwarded based on the MPLS label stack, and is sent to the node C. When receiving the packet whose destination address is C, the node C pops the MPLS label stack in the packet and forwards the packet based on the inner IPv6 packet header. The destination address in the inner IPv6 packet header is D. It can be seen that SRH (D, y1) is always carried in the packet in the entire forwarding process.

When the node A encapsulates the SRH in the SRv6 packet in a reduced SRH manner, the SRH in the SRv6 packet sent by the node A to the node B does not include the segment identifier y1, but includes the segment identifier D, that is, SRH=(D), while the IPv6 basic header remains unchanged, where the source address SA=A, and the destination address DA=y1.

Figure 2C:
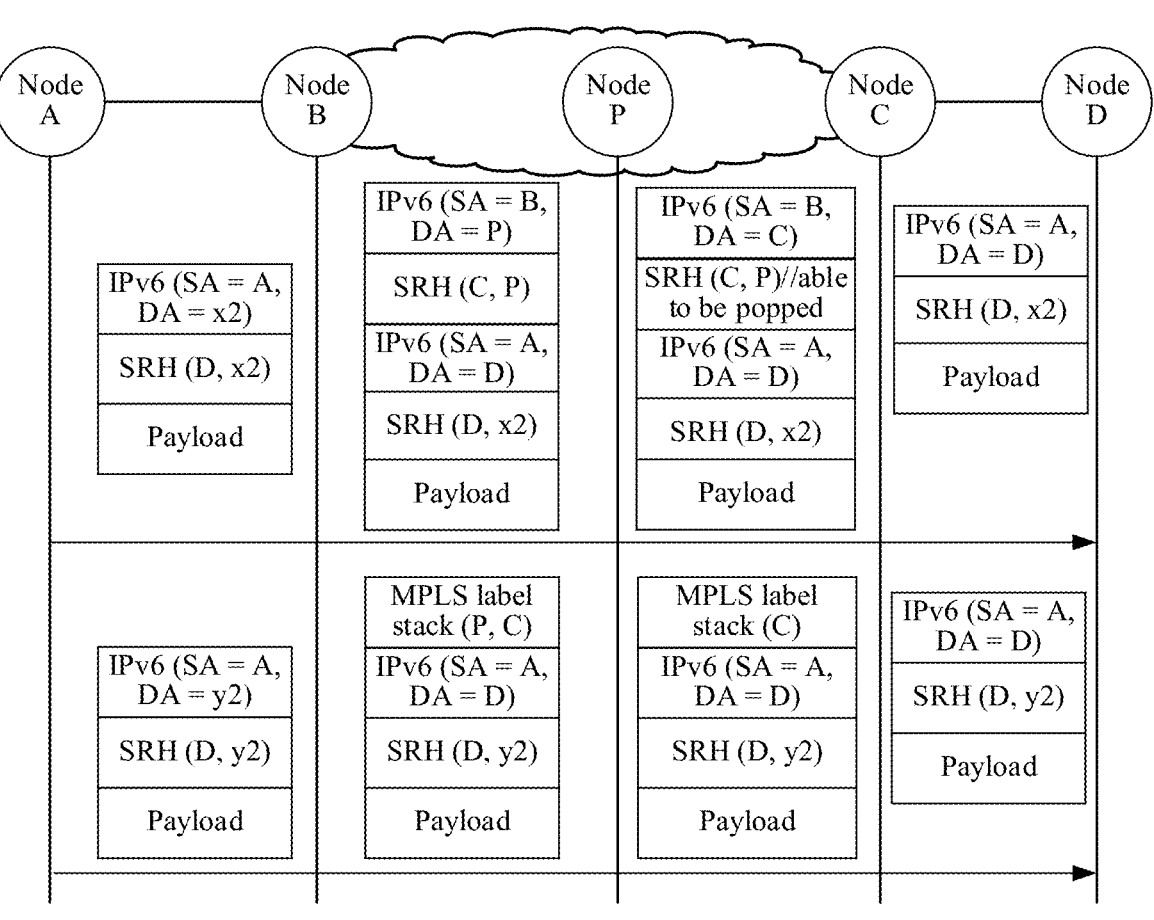
FIG. 2C is a schematic diagram of SRv6 packet transmission in another application scenario.

In another example, as shown in FIG. 2C, a segment identifier x2 is a segment identifier of the End.B6.Encaps type configured on a node B, and an SRH of an SRv6 packet sent by a node A to the node B includes the segment identifier x2 and a next segment identifier D, that is, SRH (D, x2). The node B reads the next segment identifier D from the SRH, and updates a destination address in an original IPv6 packet header by using the segment identifier D. In addition, the node B may look up, based on the segment identifier D, a routing table for path information (B-P-C) for reaching a device indicated by the segment identifier D, and encapsulate an additional IPv6 header and an additional SRH based on the path information. The newly inserted SRH sequentially includes segment identifiers of a node C and a node P, and a source address of the newly encapsulated IPv6 packet header is the node B, and a destination address is the node P. After the encapsulation is complete, the node B sends the SRv6 packet to the node P. After receiving the SRv6 packet, the node P reads a next segment identifier C from the SRH, updates a destination address in an outer IPv6 packet header by using the segment identifier C, and sends the packet to the node C. When the node P sends the packet to the node C, the node P may perform a PSP popping operation on the outbound SRH. After receiving the packet whose destination address is C, the node C strips an outer IPv6 packet header, and forwards the packet based on an inner IPv6 packet header, where a destination address in the inner IPv6 packet header is D. In the entire forwarding process, no PSP operation is performed on SRH (D, x2), and SRH (D, x2) is carried on a forwarding path B-P-C-D.

When the node A encapsulates the SRH in the SRv6 packet in a reduced SRH manner, the SRH in the SRv6 packet sent by the node A to the node B does not include the segment identifier x2, but includes the segment identifier D, that is, SRH=(D), while the IPv6 basic header remains unchanged, where a source address SA=A and a destination address DA=x2.

Similarly, a segment identifier y2 is a segment identifier of the End.BM type configured on the node B. After receiving the SRv6 packet sent by the node A, the node B reads the next segment identifier D from the SRH, and updates the destination address in the original IPv6 packet header by using the segment identifier D. In addition, the node B may look up, based on the segment identifier D, a routing table for path information (B-P-C) for reaching a device indicated by the segment identifier D, and encapsulate an additional MPLS label stack based on the path information, where the MPLS label stack includes a specified MPLS path (P, C). After the encapsulation is complete, the node B sends the SRv6 packet to the node P. After receiving the SRv6 packet, the node P sends the packet to the node C based on a node specified in the MPLS label stack. After receiving the packet whose destination address is C, the node C performs a striping operation on the MPLS label, and forwards the packet based on an inner IPv6 packet header, where a destination address in the inner IPv6 packet header is D. In the entire forwarding process, no PSP operation is performed on SRH (D, x2), and SRH (D, x2) is carried on a forwarding path B-P-C-D.

When the node A encapsulates the SRH in the SRv6 packet in a reduced SRH manner, the SRH in the SRv6 packet sent by the node A to the node B does not include the segment identifier y2, but includes the segment identifier D, that is, SRH=(D), while the IPv6 basic header remains unchanged, where the source address SA=A, and the destination address DA=y2.

It can be learned from the foregoing description that, because a node in which a currently defined binding segment identifier is located may encapsulate a received packet that carries an SRH, but is not allowed to perform a popping operation on the received packet that carries the SRH, packet transmission overheads are high. For example, in FIG. 2B or FIG. 2C, the packet sent by the node A to the node D specifies that there is only a final destination node D after a source routing node except the node B where the BSID is located. After the packet arrives at the node B, the node B updates the IPv6 packet header based on SRH (D, x1), and a subsequent node no longer requires SRH (D, x1). However, because a node where the BSID is located does not allow the SRH to be popped, SRH (D, x1) is carried in subsequent packet forwarding, wasting bandwidths between the node B and the node C and between the node C and the node D.

Figure 2D:
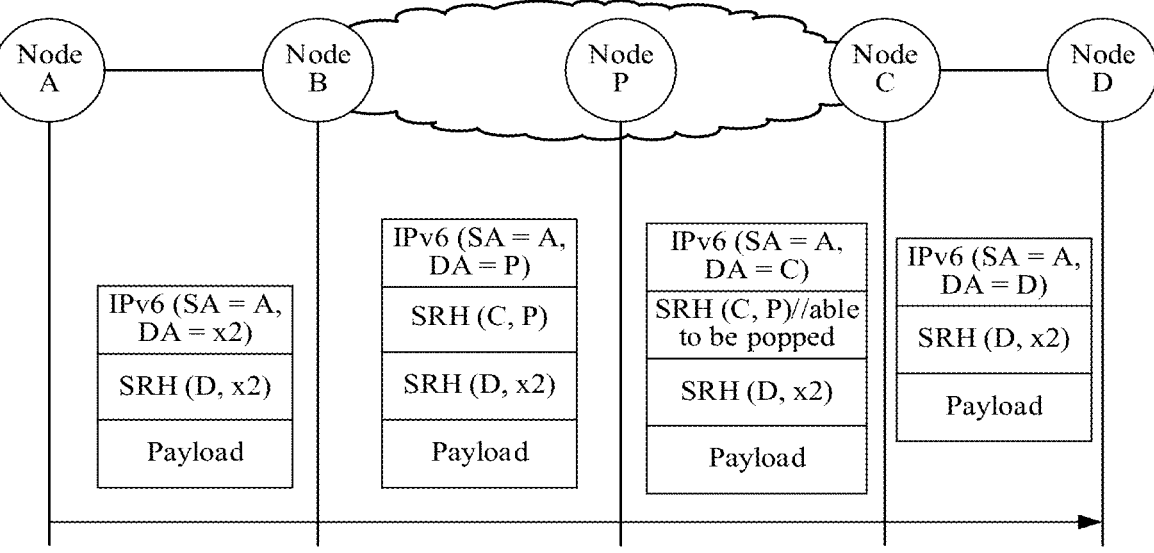
FIG. 2D is a schematic diagram of SRv6 packet transmission in another application scenario.

To prevent a new IPv6 packet header from being encapsulated on the node where the binding segment identifier is located, an additional SRH is inserted between the original IPv6 packet header and the SRH. For example, as shown in FIG. 2D, a segment identifier x2 is a segment identifier of an End.B6.Insert type configured on a node B. After receiving an SRv6 packet sent by a node A, the node B reads a next segment identifier D from an SRH, determines, based on the segment identifier D, path information (P-C) for reaching a device in which the segment identifier D is located, adds, based on the path information, a new SRH between an original IPv6 packet header and an original SRH, and adds a segment identifier list (C, P) to the new SRH. The node B sends the packet to a node P. The node P reads a next segment identifier C from an outer SRH, updates a destination address in an IPv6 packet by using the segment identifier C, and sends the updated packet to a node C. After receiving the packet, the node C reads the segment identifier D from an inner SRH, and updates the destination address in the IPv6 packet, to send the packet to a node D. When the node A encapsulates the SRH in the SRv6 packet in a reduced SRH manner, the SRH in the SRv6 packet sent by the node A to the node B does not include the segment identifier x2, but includes the segment identifier D, that is, SRH=(D), while the IPv6 basic header remains unchanged, where a source address SA=A, and a destination address DA=x2.

It can be learned from comparison between FIG. 2C and FIG. 2D that, compared with FIG. 2C, encapsulation overheads are reduced. However, the current RFC8200 standard specifies that one IPv6 packet header corresponds to one SRH, but the foregoing packet includes two SRHs, which violates the standard. In addition, a solution of inserting an additional SRH is only applicable to a binding segment identifier of the End. B6 type, and is not applicable to a binding segment identifier of the End.BM type.

Based on this, an embodiment of this application provides a packet processing method, to solve a problem of bandwidth wasting caused by a node where a segment identifier of a specific type is located being incapable of performing an SRH popping operation.

Figure 2E:
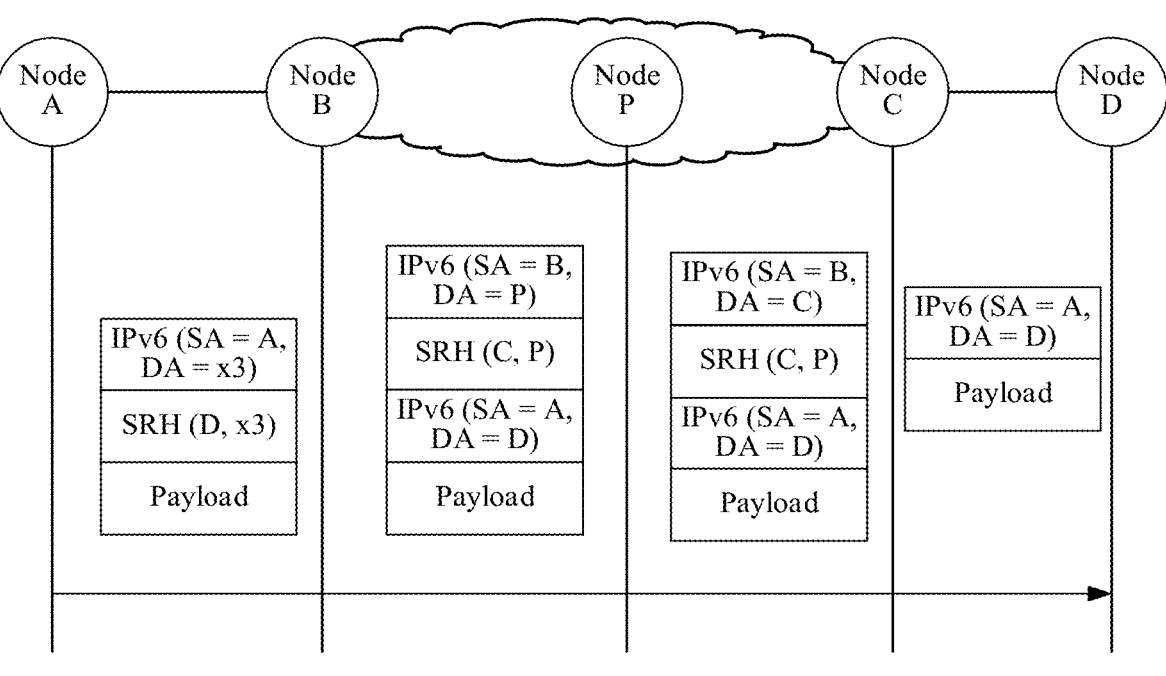
FIG. 2E is a schematic diagram of a packet processing scenario according to an embodiment of this application.

For ease of understanding, refer to a schematic diagram of an application scenario shown in FIG. 2E. In the schematic diagram of the application scenario, a segment identifier x3 is a segment identifier of the End.B6.Encaps type configured on a node B. After receiving an SRv6 packet sent by a node A, the node B reads a next segment identifier D from a SRH, updates an IPv6 packet header (SA=A, DA=x3) to (SA=A, DA=D), and deletes SRH (D, x3). In addition, path information (P-C) for reaching the device in which the segment identifier D is located is determined, a new IPv6 packet header and a new SRH are encapsulated based on the path information, and a segment identifier list (C, P) is added to the new IPv6 packet header (SA=B, DA=P) and the new SRH. The node B sends the packet to a node P. The node P reads a next segment identifier C from an outer SRH, updates a destination address in an outer IPv6 packet header to C by using the segment identifier C, and sends the updated packet to a node C. After receiving the packet, the node C removes the outer IPv6 header and SRH, and sends the packet to a node D based on a destination address in an inner IPv6 packet header.

When the node A encapsulates the SRH in the SRv6 packet in a reduced SRH manner, the SRH in the SRv6 packet sent by the node A to the node B does not include the segment identifier x3, but includes the segment identifier D, that is, SRH=(D), while the IPv6 basic header remains unchanged, where a source address SA=A and a destination address DA=x3. SL in the SRv6 packet sent by the node A to the node B is still 1.

For ease of understanding specific implementations of embodiments of this application, a packet processing method provided in embodiments of this application is described below by using the application scenario shown in FIG. 2E as an example.

Figure 3:
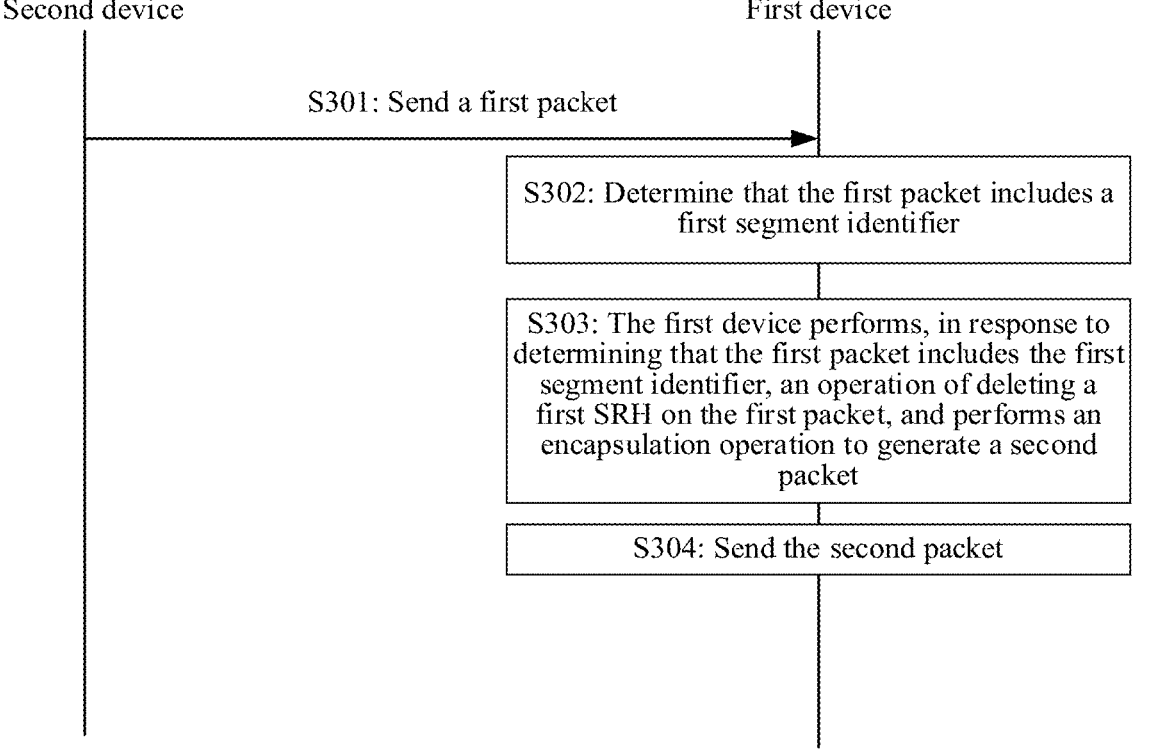
FIG. 3 is a flowchart of a packet processing method according to an embodiment of this application.

FIG. 3 is a flowchart of a packet processing method according to an embodiment of this application. As shown in FIG. 3, the method may include the following steps.

S301: A second device sends a first packet to a first device.

In this embodiment, the second device may send the first packet to the first device based on a destination address in an IPv6 header of the first packet, where the destination address in the IPv6 packet header is a first segment identifier corresponding to the first device. The first packet includes a first SRH, the first SRH may include one or more segment identifiers, and the one or more segment identifiers indicate different segments for transmitting the first packet. The one or more segment identifiers may include the first segment identifier, or may not include the first segment identifier. For example, when the second device encapsulates the first SRH in the first packet in a reduced SRH manner, the first SRH does not include the first segment identifier, but the destination address in the first packet includes the first segment identifier.

The second device may be a source node, a transit node, or an endpoint node. When the second device is a source node, the second device may be a host that generates the first packet, or may be an edge device of an SRv6 network. When the second device is an intermediate node, the second device only performs forwarding of a common IPv6 packet. When the second device is an endpoint node, the second device performs SRv6-related processing on a received SRv6 packet, and a segment identifier of the second device needs to be the destination address in the IPv6 header of the received SRv6 packet. When the second device is a host, a payload of the first packet is a packet generated by the second device. For example, the payload of the first packet is a User Datagram Protocol (UDP) header and a UDP payload. When the second device is a forwarding device, a payload of the first packet is a packet received by the second device. For example, the payload of the first packet may be an IPv4 packet, an IPv6 packet, or an Ethernet packet.

When the second device is a source node, the second device performs an SRH encapsulation operation on an obtained IPv6 packet to obtain the first packet. Alternatively, when the second device is an endpoint node, the second device performs an update operation on an SRH to obtain the first packet. Therefore, before the second device performs the encapsulation operation or updates the SRH, the first device sends the first segment identifier and indication information to the second device, so that the second device can learn of the segment identifier of the first device and the indication information. The indication information indicates that the first device has a capability of performing an SRH deletion operation. The indication information may be included in a function part of the first segment identifier, or the indication information is a flavor corresponding to the first segment identifier, or the indication information is a part of the first segment identifier. When the first device sends the first segment identifier and the indication information to the second device, the first device may directly send the first segment identifier and the indication information to the second device, or the first device may send the first segment identifier and the indication information to the second device through a controller.

The first device may further send a type of the first segment identifier to the second device. The type of the first segment identifier may be a binding segment identifier, for example, an End.B6.Encaps, End.B6.Encaps.Red, or End.BM type. Alternatively, the type of the first segment identifier is a new predefined type. For example, the new predefined type is End.B6.Encaps.DoD, End.B6.Encaps.Red.DOD, or End.BM.DoD, where DoD indicates to delete on demand an SRH header of a received packet.

A device connected to a device that generates the first packet when the device accesses a network and a device connected to a device that finally receives the first packet when the device accesses the network may be located in a same network domain or different network domains. The network domain may be an autonomous system (AS) domain, an Interior Gateway Protocol (IGP) domain, or a management domain. For example, the management domain may include a plurality of AS domains, and the plurality of AS domains are centrally managed by the controller.

S302: The first device determines that the first packet includes the first segment identifier.

After receiving the first packet, the first device determines whether the first packet includes the first segment identifier. If the first packet includes the first segment identifier, the first device performs a corresponding processing operation on the first packet based on an indication corresponding to the first segment identifier. Further, the first device determines whether the destination address in the first packet is the first segment identifier. If the destination address in the first packet is the first segment identifier, it indicates that the first packet is sent to the first device, and the first device performs the corresponding operation based on the indication of the first segment identifier.

S303: The first device performs, in response to determining that the first packet includes the first segment identifier, an operation of deleting the first SRH on the first packet, and performs an encapsulation operation to generate a second packet.

When the first device determines that the first packet includes the first segment identifier, the first device deletes the first SRH in the first packet, and performs the encapsulation operation on the first packet to obtain the second packet. The first device may first perform a deletion operation on the first SRH, and then perform the encapsulation operation on the first packet, or the first device may first perform the encapsulation operation on the first packet, and then perform a deletion operation on the first SRH. This is not limited in this embodiment.

In a specific implementation, after determining that the first packet includes the first segment identifier, the first device may further determine whether an SL field in the first SRH is 1 or whether updated SL is 0. If the SL field in the first SRH is 1 or the updated SL is 0, it indicates that the first segment identifier corresponding to the first device is a penultimate segment identifier in the first SRH. After the destination address is updated by using a segment identifier indicated by SL=0, a subsequent node no longer requires the first SRH. In this case, the first device deletes the first SRH, to reduce bandwidth resources occupied for subsequent packet transmission. Further, this may be implemented through the following pseudocode:

```
If (Segments Left == 0) {
    Update the Next Header field in the preceding header to
        the Next Header value from the SRH
    Decrease the IPv6 header Payload Length by
        8*(Hdr Ext Len+1)
    Remove the SRH from the IPv6 extension header chain  }
```

When the first SRH further includes a second segment identifier, before the first device deletes the first SRH, the first device further reads the second segment identifier from the first SRH, and updates the destination address in the first packet based on the second segment identifier. For example, the first device is the node B in FIG. 2E. When receiving an SRv6 packet sent by the node A, the node B finds that a destination address DA=x3 in an IPv6 header of the packet, where a segment identifier x3 is a segment identifier configured on the node B. In this case, the node B reads a second segment identifier D from SRH (D, x2), and updates the destination address in the IPv6 header to D. The second segment identifier indicates a next segment for transmitting the first packet.

The encapsulation operation performed by the first device may include encapsulating a first packet header into the first packet to generate the second packet. The first packet header may be an IPv6 basic header, an IPv6 header including a second SRH, or an MPLS header, and the first packet header may include path information, to indicate a transmission path of the second packet through the path information.

When the type of the first segment identifier is End. B6. Encaps, End.B6. Encaps. Red, End.B6.Encaps.DoD, or End.B6.Encaps.Red.DoD, and there is no forwarding node between the first device and a next-hop device, only a new IPv6 basic header needs to be encapsulated, and a new SRH header does not need to be added. For example, if the first device is the node B in FIG. 2B, and the determined path information is B-C, a new IPv6 basic header (SA=B, DA=C) is encapsulated into an outer layer of a packet.

Further, when the path information corresponds to a plurality of segment identifiers, the first device encapsulates, into an outer layer of the first packet, an IPv6 header including a second SRH, to generate the second packet. The second SRH includes the plurality of segment identifiers corresponding to the path information, a source address in the first packet header is an address of the first device, and a destination address is the first segment identifier in the second SRH. For example, if the first device is the node B in FIG. 2E, and the determined path information is B-P-C, the IPv6 basic header encapsulated by the first device is (SA=B, DA=P), and the second SRH is (C, P). When the node B encapsulates the second SRH in a reduced SRH manner, the second SRH does not include a segment identifier of the node P, but includes a segment identifier of the node C, that is, the second SRH (C) and IPv6 (SA=B, DA=P).

When the type of the first segment identifier is End.BM or End.BM.DoD, the first device encapsulates an MPLS header into the outer layer of the first packet, to generate the second packet. An MPLS label stack of the MPLS header includes the path information.

In this embodiment, the path information may be determined by the first device based on the first segment identifier, or determined by the first device based on the second segment identifier when the first SRH includes the second segment identifier. Further, a correspondence between the first segment identifier and the path information may be preconfigured on the first device. After determining that the first packet includes the first segment identifier, the first device may obtain the path information based on the first segment identifier and the correspondence. Alternatively, after reading the second segment identifier, the first device may look up a routing table for the path information by using the second segment identifier as the destination address. That is, the first device may look up, in a routing table iteration manner, for path information for reaching a device in which the second segment identifier is located. Alternatively, the first device determines the path information based on the second segment identifier and a preconfigured correspondence, where the correspondence includes the second segment identifier and the path information. That is, the correspondence may be preconfigured on the first device, and the correspondence indicates the path information corresponding to the device in which the second segment identifier is located. When reading the second segment identifier, the first device determines the path information based on the second segment identifier and the correspondence without performing route iteration, so that efficiency of packet forwarding is improved.

The second packet further includes a second packet header, and a destination address in the second packet header is the second segment identifier. Generally, the second packet header is an IPv6 basic header, and is obtained by updating the IPv6 basic header in the first packet. For example, in FIG. 2E, a packet sent by the node B to the node P is the second packet, the first packet header of the second packet is IPv6 (SA=B, DA=P) and SRH (C, P), and the second packet header is IPv6 (SA=A, DA=D).

S304: The first device sends the second packet.

After generating the second packet, the first device forwards the second packet based on the first packet header in the second packet. Further, the first device sends the second packet to a device corresponding to the destination address in the first packet header.

The second SRH may include a third segment identifier and a fourth segment identifier that are sequentially arranged. The fourth segment identifier may be the last executed segment identifier in a plurality of segment identifiers included in the second SRH. An indication corresponding to the third segment identifier is to perform an encapsulation operation, and the third segment identifier is a segment identifier of a third device. When the destination address in the first packet header of the second packet is the third segment identifier, the first device sends the second packet to the third device.

It should be noted that when the indication corresponding to the third segment identifier is to perform the encapsulation operation, and indication information of the third segment identifier indicates that the third device has a capability of performing an SRH deletion operation, after receiving the second packet, the third device may also perform corresponding operations in S302 and S303. For details, refer to the foregoing description.

It can be learned that the first device receives the first packet sent by the second device, where the first packet includes the first SRH, and the first SRH includes the first segment identifier. The first segment identifier is a segment identifier corresponding to the first device, and the indication corresponding to the first segment identifier is to perform an encapsulation operation. After receiving the first packet sent by the second device, the first device determines whether the first packet includes the first segment identifier. After determining that the first packet includes the first segment identifier, the first device deletes the first SRH, performs the encapsulation operation, to generate the second packet, and sends the second packet. The second packet no longer includes the first SRH, so that a bandwidth occupied for transmitting the second packet is reduced, and efficiency of packet transmission is improved. In other words, in this embodiment of this application, when the first device needs to perform the encapsulation operation, a function of deleting an SRH of a received packet on demand may be added, so that the first device can delete an SRH in a packet on demand, to reduce occupied bandwidth resources.

Figure 4:
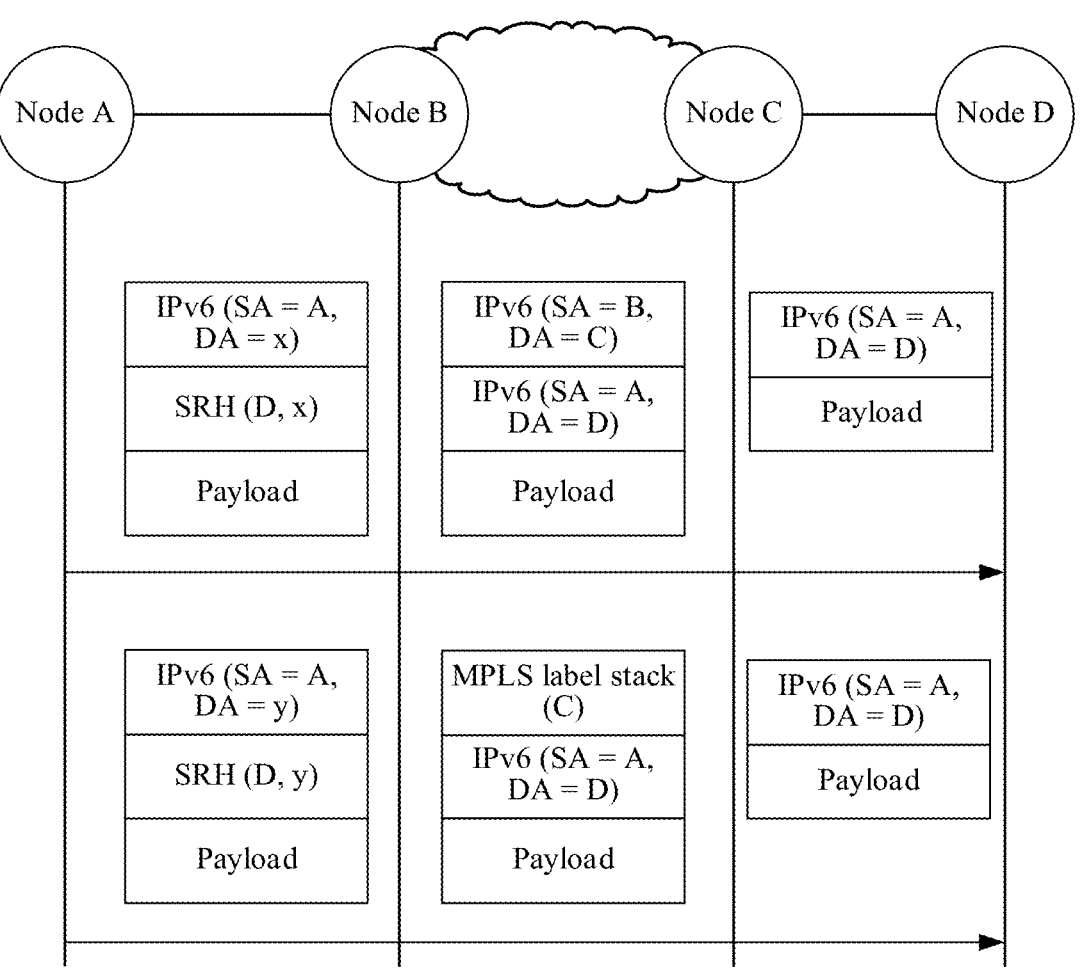
FIG. 4 is a schematic diagram of another packet processing scenario according to an embodiment of this application.

It should be noted that in this embodiment, the second device may be a host or a forwarding device such as a router. When the second device is a host, a payload of the first packet is a packet generated by the second device. When the second device is a forwarding device, a payload of the first packet is a packet received by the second device. For ease of understanding, refer to a schematic diagram of an application scenario shown in FIG. 4, where x is an SRv6 BSID on a node B, and may be of, for example, an End.B6.Encaps.DOD type or an End.B6.Encaps. Red. Dod type, and y is another SRv6 BSID on B, and may be of, for example, an End.BM.DoD type. A packet forwarding process is as follows.

Step 1: A node A sends a first packet to a node B.

In this embodiment, before sending the first packet to the node B, the node A receives segment identifier information sent by the node B. The segment identifier information sent by the node B includes a SID value (an IPv6 address), a segment identifier type (such as End.B6.Encps and End.BM), and indication information. The indication information indicates that the node B has a capability of deleting an SRH in a received packet on demand. The indication information and the segment identifier may be combined into one field.

After receiving the segment identifier information sent by the node B, the node A encapsulates the segment identifier information into the obtained packet, and uses a SID of the node B as a destination node, to obtain the first packet. When the node A is a host, a payload in the first packet is a packet directly sent by the node A, for example, may include a UDP header and a UDP payload. When the node A is a router, the payload in the first packet is a packet received by the node A, and may be an IPv4 packet, an IPv6 packet, or an Ethernet packet.

When a type of a segment identifier released by the node B is an End. B6.Encaps or End.B6.Encaps. Red type and the SID value is x, an IPv6 basic header encapsulated by the node A is (SA=A, DA=x), SRH (D, x). That is, a final destination node that the first packet needs to arrive at through a node corresponding to x is a node D. When the segment identifier type released by the node B is End. BM and the SID value is y, the IPv6 basic header encapsulated by the node A is (SA=A, DA=y), SRH (D, y). That is, the final destination node that the first packet needs to arrive at through a node corresponding to y is the node D.

When the node A encapsulates the SRH of the packet in a reduced SRH manner, the SRH does not include a segment identifier of the node B, but includes a segment identifier of the node D, while the IPv6 basic header remains unchanged.

Step 2: The node B reads a segment identifier D from an SRH of the first packet.

Step 3: The node B updates a destination address in the IPv6 basic header in the first packet based on the segment identifier D.

After receiving the first packet sent by the node A, the node B reads a next segment identifier, that is, the segment identifier D, from the SRH of the first packet, and updates the destination address in the IPv6 basic header in the first packet to the segment identifier D.

Step 4: The node B obtains path information for reaching the node D based on the segment identifier D.

In this embodiment, the node B may learn, by obtaining the segment identifier D, that the final destination node of the first packet is the node D, and obtain, based on the segment identifier D, the path information for reaching the node D. The node B may obtain the path information by iterating a routing table based on the segment identifier D, or the node B obtains the path information based on the segment identifier D and a preconfigured correspondence between the path information and the segment identifier. For example, (segment identifier D: B-C) is preconfigured on the node B. When obtaining the segment identifier D, the node B determines, based on the foregoing relationship, path information of the segment identifier D corresponding to B→C.

Step 5: The node B deletes the SRH, and encapsulates the first packet based on the path information, to obtain a second packet.

In this embodiment, SL in the SRH in the first packet received by the node B is 1 (pointing to a penultimate SID in a SID list, BISD). After the SL is subtracted by 1, the SL is 0, and a condition for deleting the SRH in the received packet on demand is met, the SRH in the first packet is deleted. In addition, the node B re-encapsulates the first packet based on the determined path information. Further, when the segment identifier of the node B is x, the node B encapsulates a new IPv6 basic header into an outer layer of the first packet, where the IPv6 basic header is (SA=B, DA=C). When the segment identifier of the node B is y, the node B encapsulates a new MPLS header (MPLS label stack) into the outer layer of the first packet, where the MPLS label stack is (C).

Step 6: The node B sends the second packet to a node C.

Step 7: The node C pops an outer IPv6 basic header or an MPLS label stack in the second packet.

Step 8: The node C sends the second packet to the node D based on a destination address in an inner IPv6 basic header in the second packet.

After receiving the second packet, the node C determines, based on a destination address in the outer IPv6 basic header of the second packet, that the node C is a node corresponding to the destination address, pops the outer IPv6 basic header (SA=B, DA=C) or the MPLS label stack (C), and then sends the second packet to the node D based on the destination address in the inner IPv6 basic header, to send the packet to a final destination node. For the second packet, the node C is a transmission node of the packet, and does not perform another operation.

Figure 5:
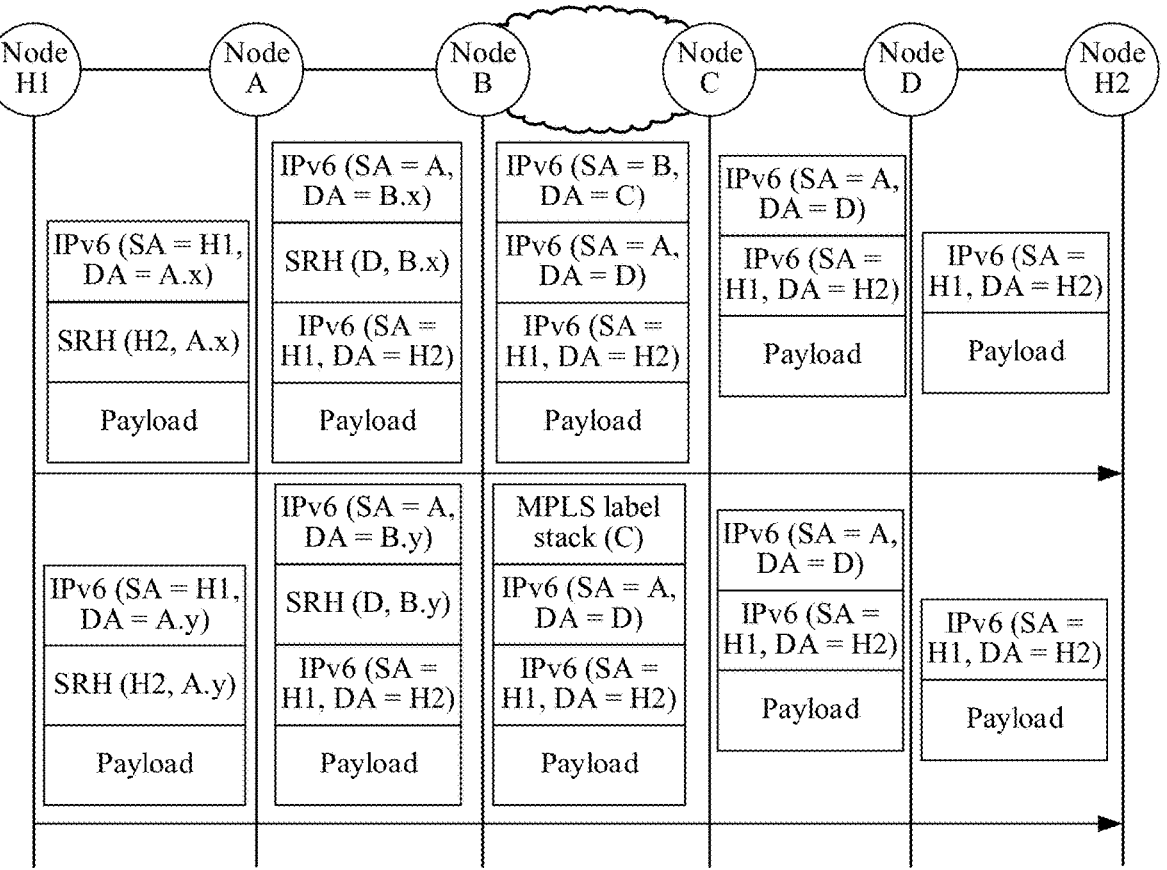
FIG. 5 is a schematic diagram of still another packet processing scenario according to an embodiment of this application.

In an actual application scenario, when there may be a plurality of segment identifiers on which an encapsulation operation needs to be performed, a function of deleting an SRH in a received packet on demand is configured for all nodes corresponding to the plurality of segment identifiers on which the encapsulation operation needs to be performed, to save transmission bandwidths. For ease of understanding, embodiments of this application are described below with reference to the accompanying drawings. FIG. 5 shows a hierarchical nesting application scenario according to an embodiment of this application. A.x is an SRv6 BSID on a node A, and may be of an End.B6.Encaps or End.B6.Encaps. Red type. A.y is an SRv6 BSID on the node A, and may be of the End. B6.Encaps or End.B6. Encaps. Red type. B.x is an SRv6 BSID on a node B, and may be of the End. B6. Encaps or End. B6. Encaps. Red type. B.y is an SRv6 BSID on the node B, and may be of an End.BM type. A payload is a packet directly sent by a host H1, for example, may be a UDP header+a UDP Payload.

In this embodiment, for the SID A.x on the node A, the following process exists.

Step 1: The node A receives an IPv6 packet sent by H1, where a destination address in the IPv6 packet is A.x, and the address A.x is an SRv6 BSID on the node A. The node A encapsulates the packet accordingly, and encapsulates a tunnel with the node A as a start point and a node D as an endpoint. The endpoint D of the tunnel may be determined when A.x is configured, or may be determined by the node A based on a next SID, that is, H2, of the destination address in the received packet through route iteration. In addition, the node A updates the destination address in an IPv6 header to the next SID, that is, H2.

When the node H1 encapsulates an SRH of the packet in a reduced SRH manner, the SRH in the packet sent by the node H1 to the node A does not include the segment identifier A.x of the node A, but includes a segment identifier H2 of a node H2, while an IPv6 basic header remains unchanged (SA=H1, DA=A.x).

When the node A encapsulates the received packet, there is only H2 after A.x, which meets a condition of deleting an SRH in a received packet on demand. In this case, the node A deletes the SRH in the received IPv6 packet on demand, and then encapsulates the packet after the deletion. In this embodiment, encapsulation corresponding to the segment identifier A.x is performed on an IPv6 basic header and an SRH header, where the SRH header specifies that a SID List is B.x and D, and a source address of the IPv6 basic header is A, and a destination address is B.x. After the packet is encapsulated, the node A sends the packet to the node B.

When the node A encapsulates the SRH of the packet in the reduced SRH manner, the SRH does not include a segment identifier B.x of the node B, but includes a segment identifier D of the node D, that is, SRH (D), while an IPv6 basic header remains unchanged (SA=A, DA=B.x).

Step 2: The node B receives the IPv6 packet whose destination address is B.x, where the address B.x is an SRv6 BSID on the node B. The node B encapsulates the packet accordingly, and encapsulates a tunnel with the node B as a start point and a node C as an endpoint. The endpoint C of the tunnel may be determined when B.x is configured, or may be determined by the node B based on a next SID, that is, D, of the destination address in the received packet. In addition, the node B updates the IPv6 basic header (SA=A, DA=B.x) to (SA=A, DA=D).

Because there is only D after the SID B.x, which meets the condition for deleting the SRH in the received packet on demand, the node B further deletes the SRH in the received IPv6 packet on demand, and then encapsulates the packet after the deletion. In this example, encapsulation corresponding to the segment identifier B.x is performed on an IPv6 basic header (SA=B, DA=C). After the packet is encapsulated, the node B sends the packet to the node C.

Step 3: After receiving the IPv6 packet, the node C strips an outermost IPv6 basic header and forwards the packet based on an inner IPv6 basic header, where a destination address in the inner packet header is D, and C is a transit node of the packet.

Step 4: After receiving the IPv6 packet, the node D strips an outermost IPv6 basic header and forwards the packet based on an inner IPv6 basic header, where a destination address in the inner packet header is H2, and D is a transit node of the packet.

Similarly, in this embodiment, for the SID A.y configured by the node A, the following process exists:

Step 1: The node A receives an IPv6 packet whose destination address is A.y, where the address A.y is an SRv6 BSID on the node A (an encapsulation operation needs to be performed). The node A encapsulates the packet accordingly, and encapsulates a tunnel with the node A as a start point and the node D as an endpoint. The endpoint D of the tunnel may be determined when A.y is configured, or may be determined by the node A based on a next SID, that is, H2, of the destination address in the received packet. In addition, the node A updates the destination address in an IPv6 header to the next SID, that is, H2.

When the node H1 encapsulates the SRH of the packet in the reduced SRH manner, the SRH in the packet sent by the node H1 to the node A does not include the segment identifier A.y of the node A, but includes the segment identifier H2 of the node H2, while an IPv6 basic header remains unchanged (SA=H1, DA=A.y).

Because there is only H2 after the SID A.y, which meets the condition for deleting the SRH in the received packet on demand, the node A deletes SRH (H2, A.y) in the received IPv6 packet on demand, and then encapsulates the packet after the deletion. Encapsulation corresponding to the segment identifier A.y is performed on an IPv6 basic header and an SRH header, where the SRH header specifies that the SID List is B.y and D, and the destination address is B.y. After the packet is encapsulated, the node A sends the packet to the node B.

When the node A encapsulates the SRH of the packet in the reduced SRH manner, the SRH does not include a segment identifier B.y of the node B, but includes the segment identifier D of the node D, that is, SRH (D), while the IPv6 basic header remains unchanged (SA=A, DA=B.y).

Step 2: The node B receives the IPv6 packet, where a destination address in the IPv6 packet is B.y, and the address B.y is an SRv6 BSID on the node B (an encapsulation operation needs to be performed). The node B encapsulates the packet accordingly, and encapsulates a tunnel with B as a start point and C as an endpoint. The endpoint C of the tunnel may be determined when B.y is configured, or may be determined by the node B based on a next SID, that is, D, of the destination address in the received packet. In addition, the node B updates the destination address in the IPv6 basic header to the next SID, that is, D.

Because there is only D after the SID B.y, which meets the condition for deleting the SRH in the received packet on demand, the node B deletes the SRH in the received IPv6 packet on demand, and then encapsulates the packet after the deletion. The node B encapsulates an MPLS label stack (C). After the packet is encapsulated, the node B sends the packet to the node C.

Step 3: The node C receives the IPv6 packet, strips an outermost MPLS label stack of the IPv6 packet and forwards the packet based on the IPv6 header of the packet, where the destination address in the packet is D, and C is a transit node of the packet.

Step 4: The node D receives the IPv6 packet, strips an outermost IPv6 basic header of the IPv6 packet and forwards the packet based on the IPv6 basic header of the packet, where the destination address in the packet is H2, and D is a transit node of the packet.

Figure 6:
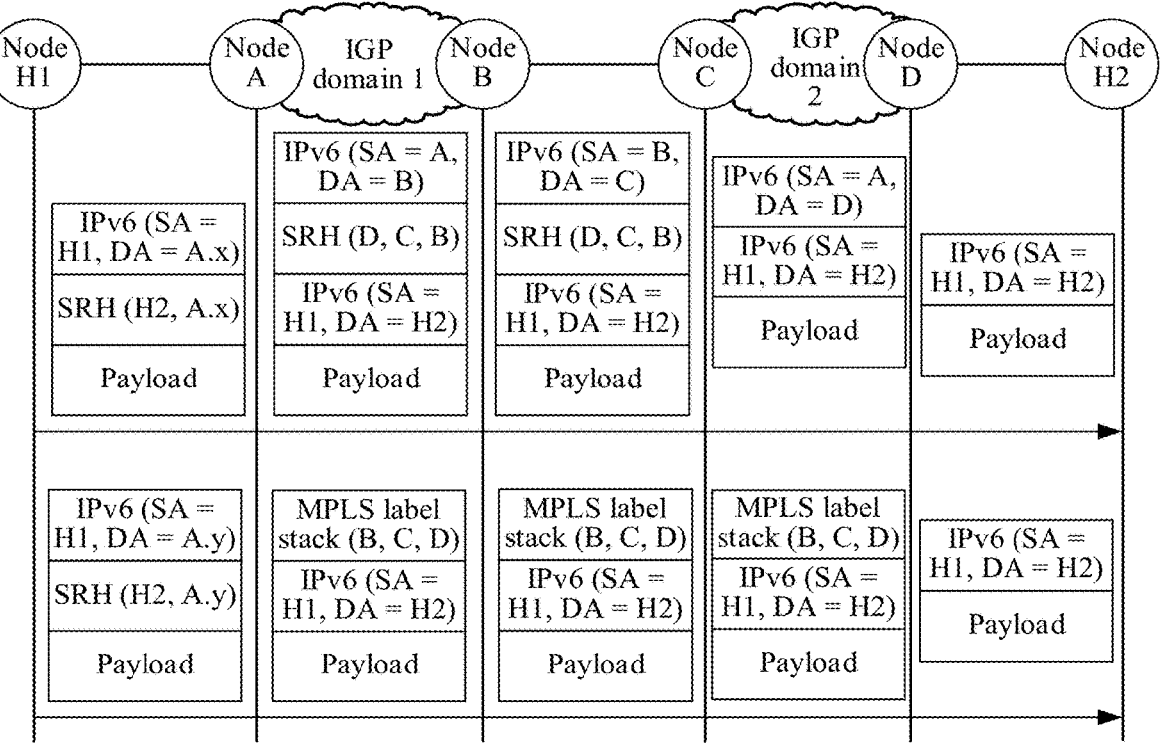
FIG. 6 is a schematic diagram of a cross-domain packet processing scenario according to an embodiment of this application.

In addition, a device connected when a source node accesses a network and a device connected when a destination node accesses the network are located in different network domains. The network domain may be an autonomous system AS domain, an IGP domain, or a management domain. For example, the management domain may include a plurality of AS domains, and the plurality of AS domains are centrally managed by the controller. For example, in an application scenario shown in FIG. 6, a host H1 accesses a network through a node A, the node A and a node B are in an IGP domain 1, a host H2 accesses the network through a node C, and the node C and a node D are in an IGP domain 2. A domain formed by the node A and the node B may run an Intermediate System-to-Intermediate System (IS-IS) protocol, a domain formed by the node C and the node D runs an Open Shortest Path First (OSPF) protocol, and the node B and the node C use a Border Gateway Protocol (BGP). IS-IS and OSPF are IGP protocols.

A segment identifier A.x is an SRv6 BSID on the node A, and may be of an End.B6.Encaps or End.B6.Encaps.Red type. A segment identifier A.y is another SRv6 BSID on the node A, and may be of an End.BM type. Payload is a packet directly sent by the host H1, for example, may be a UDP header+a UDP Payload.

In this embodiment, for the SID A.x on the node A, the following process exists.

Step 1: The node A receives an IPv6 packet sent by H1, where a destination address in the packet is A.x, and the address A.x is an SRv6 BSID on the node A (an encapsulation operation needs to be performed). The node A encapsulates the packet accordingly, and encapsulates a tunnel with A as a start point and D as an endpoint. The endpoint D of the tunnel may be determined when A.x is configured, or may be determined by the node A based on a next SID, that is, H2, of the destination address in the received packet. In addition, the node A updates the destination address in an IPv6 header to the next SID, that is, H2.

When the node H1 encapsulates an SRH of the packet in a reduced SRH manner, the SRH in the packet sent by the node H1 to the node A does not include the segment identifier A.x of the node A, but includes a segment identifier H2 of a node H2, while an IPv6 basic header remains unchanged (SA=H1, DA=A.x).

When the node A encapsulates the received packet, there is only H2 after A.x, which meets a condition of deleting an SRH in a received packet on demand. In this case, the node A deletes SRH (H2, A.x) in the received IPv6 packet on demand, and then encapsulates the packet after the deletion. In this embodiment, encapsulation corresponding to the segment identifier A.x is performed on an IPv6 basic header and an SRH header, where the SRH header specifies that a SID List is B, C, and D, and a source address of the IPv6 basic header is A, and a destination address is B. After the packet is encapsulated, the node A sends the packet to the node B.

When the node A encapsulates the SRH of the packet in the reduced SRH manner, the SRH does not include a segment identifier B of the node B, but includes a segment identifier C of the node C and a segment identifier D of the node D, that is, SRH (D, C), while the IPv6 basic header remains unchanged (SA=A, DA=B).

Step 2: The node B receives the IPv6 packet sent by the node A, where the destination address in the IPv6 packet is B. For example, the destination address B may be an End or End.X SID configured on the node B. The node B reads a next SID, that is, C, in the SID List, updates a destination address in an outer IPv6 header to C, and sends the updated IPv6 packet to the node C.

Step 3: The node C receives the IPv6 packet sent by the node B, where the destination address in the IPv6 packet is C. For example, the destination address C may be an End or End.X SID configured on the node C. The node C reads a next SID, that is, D, in the SID List, updates the destination address in the outer IPv6 header to D, and sends the updated IPv6 packet to the node D.

It should be noted that because the node C is configured with an End or End. X SID, and there is only D after C in the SRH, the node C may perform a PSP popping operation on the SRH. Therefore, the IPv6 packet sent by the node C to the node D does not include the SRH.

Step 4: After the node D receives the packet sent by the node C, the destination address in the IPv6 packet is D, and the node D strips an outermost IPv6 header and forwards the packet based on an innermost IPv6 header, where a destination address in the inner IPv6 header is H2, D is a transit node of the packet, and the node D sends the packet to the node H2 based on the destination address H2 of the inner packet.

In this embodiment, for the SID A.y on the node A, the following process exists.

Step 1: The node A receives an IPv6 packet sent by H1, where the destination address in the packet is A.y, and the address A.y is an SRv6 BSID on the node A (an encapsulation operation needs to be performed). The node A encapsulates the packet accordingly, and encapsulates a tunnel with A as a start point and D as an endpoint. The endpoint D of the tunnel may be determined when A.y is configured, or may be determined by the node A based on a next SID, that is, H2, of the destination address in the received packet. In addition, the node A updates the destination address in an IPv6 header to the next SID, that is, H2.

When the node H1 encapsulates the SRH of the packet in the reduced SRH manner, the SRH in the packet sent by the node H1 to the node A does not include the segment identifier A.y of the node A, but includes the segment identifier H2 of the node H2, while an IPv6 basic header remains unchanged (SA=H1, DA=A.y).

When the node A encapsulates the received packet, there is only H2 after A.y, which meets a condition of deleting an SRH in a received packet on demand. In this case, the node A deletes SRH (H2, A.y) in the received IPv6 packet on demand, and then encapsulates the packet after the deletion. In this embodiment, encapsulation corresponding to the segment identifier A.y is performed on an MPLS label stack, and a label-switched path (LSP) represented by the MPLS label stack passes through B, C, and D in sequence. After the packet is encapsulated, the node A sends the packet to the node B.

Step 2: After receiving an MPLS packet, the node B sends the packet to the node C along the LSP path based on the label stack.

Step 3: The node C receives the MPLS packet, and sends the packet to the node D along the LSP path based on the label stack.

Step 4: The node D receives the MPLS packet, strips the MPLS label stack from the packet, and forwards the packet based on an inner IPv6 header, where a destination address in the inner IPv6 header is H2, D is a transit node of the packet, and the node D sends the packet to the node H2 based on the destination address H2 of the inner packet.

Figure 7:
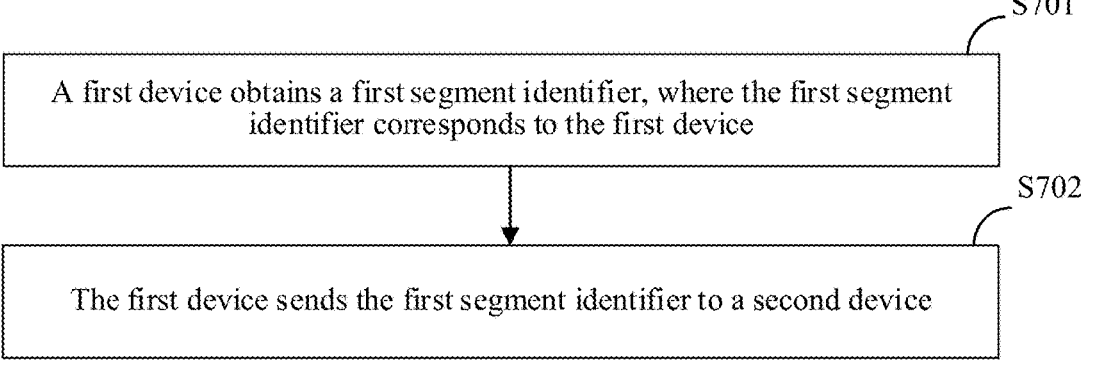
FIG. 7 is a flowchart of a segment identifier releasing method according to an embodiment of this application.

FIG. 7 is a flowchart of a segment identifier releasing method according to an embodiment of this application. As shown in FIG. 7, the method may include the following steps.

S701: A first device obtains a first segment identifier, where the first segment identifier corresponds to the first device.

In this embodiment, the first device may locally generate the first segment identifier, where the first segment identifier corresponds to the first device, and indicates that the first device has a capability of performing an SRH deletion operation.

The first segment identifier may be a segment identifier of an End. B6 type, or a segment identifier of an End.BM type. Alternatively, the first segment identifier is a segment identifier of an End.B6.Dod type, or a segment identifier of an End.BM.Dod type. For related descriptions of the type of the first segment identifier, refer to related descriptions in the method embodiment shown in FIG. 3.

When obtaining the first segment identifier, the first device may further obtain indication information corresponding to the first segment identifier. The indication information indicates that a segment (the first device) corresponding to the first segment identifier has a capability of performing an SRH deletion operation. The indication information may be included in a function part of the first segment identifier, or the indication information is a flavor corresponding to the first segment identifier, or the indication information is a part of the first segment identifier. For related descriptions of the indication information, refer to related descriptions in the method embodiment shown in FIG. 3.

S702: The first device sends the first segment identifier to a second device.

After obtaining the first segment identifier, the first device sends the first segment identifier to the second device, so that the second device encapsulates the first segment identifier into a corresponding packet. When the packet is forwarded to the first device, the first device may delete an SRH in the packet based on an indication of the first segment identifier. The second device may encapsulate the first segment identifier into a destination address in the packet, or encapsulate the first segment identifier into the SRH of the packet. In addition, the first device may further send the indication information corresponding to the first segment identifier to the second device.

The first device may directly send the first segment identifier and the indication information to the second device, or send the first segment identifier and the indication information to the second device through a controller.

Based on the foregoing method embodiment, embodiments of this application provide a packet processing apparatus, a segment identifier releasing apparatus, and a network device. The following provides descriptions with reference to the accompanying drawings.

Figure 8:
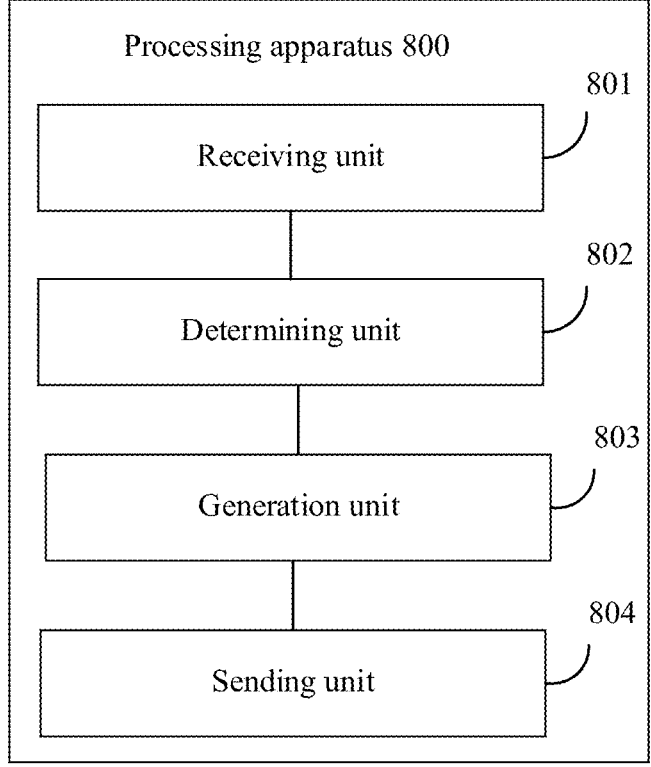
FIG. 8 is a schematic diagram of a structure of a processing apparatus according to an embodiment of this application.

FIG. 8 is a schematic diagram of a structure of a packet processing apparatus according to an embodiment of this application. As shown in FIG. 8, the apparatus can implement a function of the first device in the foregoing method embodiment. The apparatus 800 may include a receiving unit 801, a determining unit 802, a generation unit 803, and a sending unit 804.

The receiving unit 801 is configured to receive a first packet sent by a second device, where the first packet includes a first SRH.

The determining unit 802 is configured to determine that the first packet includes a first segment identifier, where the first segment identifier is a segment identifier corresponding to the first device. For specific implementations of the determining unit 802, refer to related descriptions of S302.

The generation unit 803 is configured to perform, in response to determining that the first packet includes the first segment identifier, an operation of deleting the first SRH on the first packet, and perform an encapsulation operation to generate a second packet. For specific implementations of the generation unit 803, refer to related descriptions of S303.

The sending unit 804 is configured to send the second packet.

In a specific implementation, the generation unit 803 is further configured to determine that SL in the first SRH is equal to 1 or updated SL is equal to 0, and perform, in response to determining that the first packet includes the first segment identifier and that the SL is equal to 1 or the updated SL is equal to 0, the operation of deleting the first SRH on the first packet, and perform the encapsulation operation to generate the second packet.

In a specific implementation, a type of the first segment identifier is a binding segment identifier.

In a specific implementation, the first segment identifier is a segment identifier of an endpoint bound to an SRv6 policy End. B6 type, or a segment identifier of an endpoint bound to an SR-MPLS policy End.BM type.

In a specific implementation, the first segment identifier is a segment identifier of an endpoint bound to an SRv6 policy delete on demand End.B6.Dod type, or a segment identifier of an endpoint bound to an SR-MPLS policy delete on demand End.BM.Dod type.

In a specific implementation, the generation unit 803 is further configured to delete the first SRH in the first packet, and encapsulate a first packet header into the first packet to generate the second packet.

In a specific implementation, the first packet header is an IPv6 basic header, an IPv6 header including a second SRH, or an MPLS header.

In a specific implementation, the first packet header includes path information, and the path information indicates a transmission path of the second packet.

In a specific implementation, the path information corresponds to the first segment identifier.

In a specific implementation, the first SRH includes a second segment identifier, the second segment identifier indicates a next segment for transmitting the first packet, and the path information corresponds to the second segment identifier.

In a specific implementation, the second packet further includes a second packet header, and a destination address in the second packet header is the second segment identifier.

In a specific implementation, a segment identifier list in the second SRH includes the path information, or a label stack of the MPLS header includes the path information.

In a specific implementation, the second device is a host, and a payload of the first packet is a packet generated by the second device, or the second device is a forwarding device, and a payload of the first packet is a packet received by the second device.

In a specific implementation, a device connected to a device that generates the first packet when the device accesses a network and a device connected to a device that finally receives the first packet when the device accesses the network belong to different network domains.

In a specific implementation, the apparatus further includes the sending unit.

The sending unit is configured to send the first segment identifier and indication information to the second device, where the indication information indicates that the first device has a capability of performing an SRH deletion operation. For specific implementations of the sending unit, refer to related descriptions of S301.

In a specific implementation, the indication information is included in a function part of the first segment identifier, or the indication information is a flavor corresponding to the first segment identifier.

It should be noted that for an implementation of each unit in this embodiment, refer to related descriptions in the foregoing method embodiment, and details are not described herein again in this embodiment.

Figure 9:
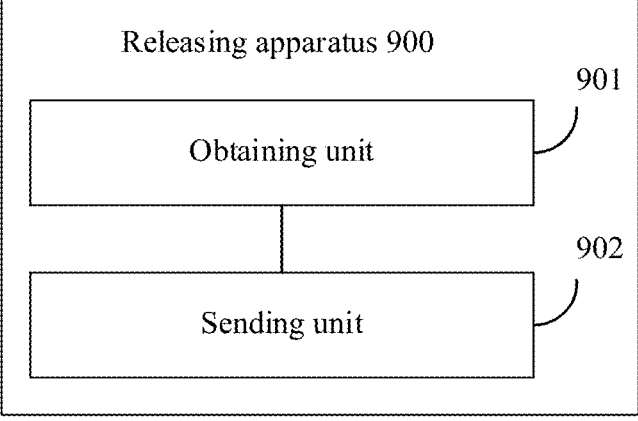
FIG. 9 is a schematic diagram of a structure of a releasing apparatus according to an embodiment of this application.

FIG. 9 is a diagram of a structure of a segment identifier releasing apparatus according to an embodiment of this application. As shown in FIG. 9, the apparatus 900 can implement a function of the first device. The apparatus may include an obtaining unit 901 and a sending unit 902.

The obtaining unit 901 is configured to obtain a first segment identifier, where the first segment identifier corresponds to a first device, and indicates that the first device has a capability of performing an SRH deletion operation. For specific implementations of the obtaining unit 901, refer to related descriptions of S701.

The sending unit 902 is configured to send the first segment identifier to a second device, so that the second device encapsulates the first segment identifier into a corresponding packet. For specific implementations of the sending unit 902, refer to related descriptions of S702.

In a specific implementation, the sending unit is further configured to send, to the second device, indication information corresponding to the first segment identifier, where the indication information indicates that a segment corresponding to the first segment identifier has a capability of performing an SRH deletion operation.

In a specific implementation, the indication information is included in a function part of the first segment identifier, or the indication information is a flavor corresponding to the first segment identifier, or the indication information is a part of the first segment identifier.

In a specific implementation, the sending unit 902 is further configured to send the first segment identifier to the second device through a controller.

In a specific implementation, the first segment identifier is a segment identifier of an End.B6 type or a segment identifier of an End.BM type.

In a specific implementation, the first segment identifier is a segment identifier of an End.B6.Dod type, or a segment identifier of an End.BM.Dod type.

It should be noted that for an implementation of each unit in this embodiment, refer to related descriptions in the foregoing method embodiment, and details are not described herein again in this embodiment.

Figure 10:
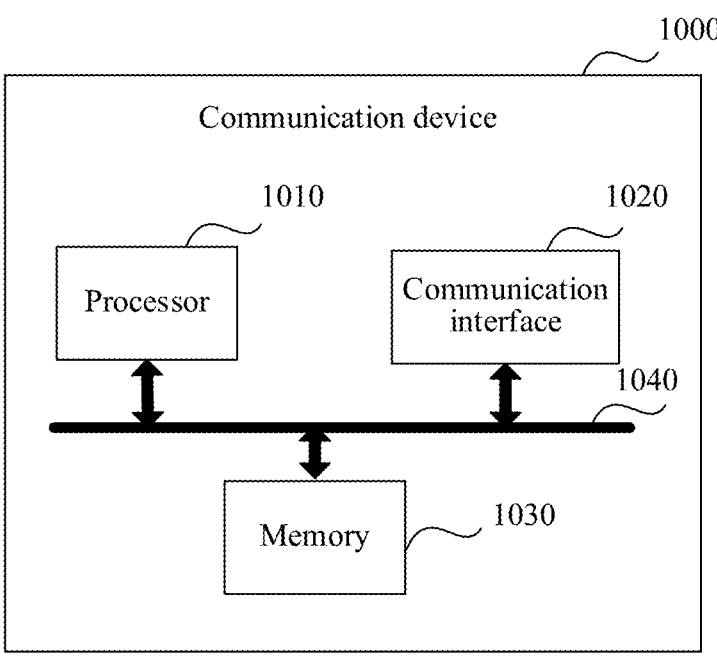
FIG. 10 is a schematic diagram of a structure of a communication device according to an embodiment of this application.

FIG. 10 is a schematic diagram of a structure of a communication device according to an embodiment of this application. For example, the communication device may be the first device, the second device, or the third device in the method embodiment, or may be implemented by the device of the apparatus 800 in the embodiment shown in FIG. 8, or may be implemented by the device of the apparatus 900 in the embodiment shown in FIG. 9.

Referring to FIG. 10, the communication device 1000 includes at least a processor 1010. The communication device 1000 may further include a communication interface 1020 and a memory 1030. There may be one or more processors 1010 in the communication device 1000. In FIG. 10, one processor is used as an example. In this embodiment of this application, the processor 1010, the communication interface 1020, and the memory 1030 may be connected through a bus system or in another manner. In FIG. 10, an example in which the processor 1010, the communication interface 1020, and the memory 1030 are connected through a bus system 1040 is used.

The processor 1010 may be a central processing unit (CPU), a network processor (NP), or a combination of a CPU and an NP. The processor 1010 may further include a hardware chip. The hardware chip may be an application-specific integrated circuit (ASIC), a programmable logic device (PLD), or a combination thereof. The PLD may be a complex PLD (CPLD), a field-programmable gate array (FPGA), a generic array logic (GAL), or any combination thereof.

When the communication device is the first device, the processor 1010 may perform an operation of deleting the first SRH on the first packet in the foregoing method instance, and perform a related function such as an encapsulation operation.

The communication interface 1020 is configured to receive and send a packet. Further, the communication interface 1020 may include a receiving interface and a sending interface. The receiving interface may be configured to receive a packet, and the sending interface may be configured to send a packet. There may be one or more communication interfaces 1020.

The memory 1030 may include a volatile memory, for example, a random-access memory (RAM). The memory 1030 may further include a non-volatile memory, for example, a flash memory, a hard disk drive (HDD), or a solid-state drive (SSD). The memory 1030 may further include a combination of the foregoing types of memories.

Optionally, the memory 1030 stores an operating system, a program, an executable module or a data structure, a subset thereof, or an extended set thereof, where the program may include various operation instructions, to implement various operations. The operating system may include various system programs, to implement various basic services and process a hardware-based task. The processor 1010 may read the program in the memory 1030, to implement the packet processing method provided in embodiments of this application.

The memory 1030 may be a storage device in the communication device 1000, or may be a storage apparatus independent of the communication device 1000.

The bus system 1040 may be a Peripheral Component Interconnect (PCI) bus, an Extended Industry Standard Architecture (EISA) bus, or the like. The bus system 1040 may include an address bus, a data bus, a control bus, and the like. For ease of representation, only one thick line is for representing the bus in FIG. 10, but this does not mean that there is only one bus or only one type of bus.

Figure 11:
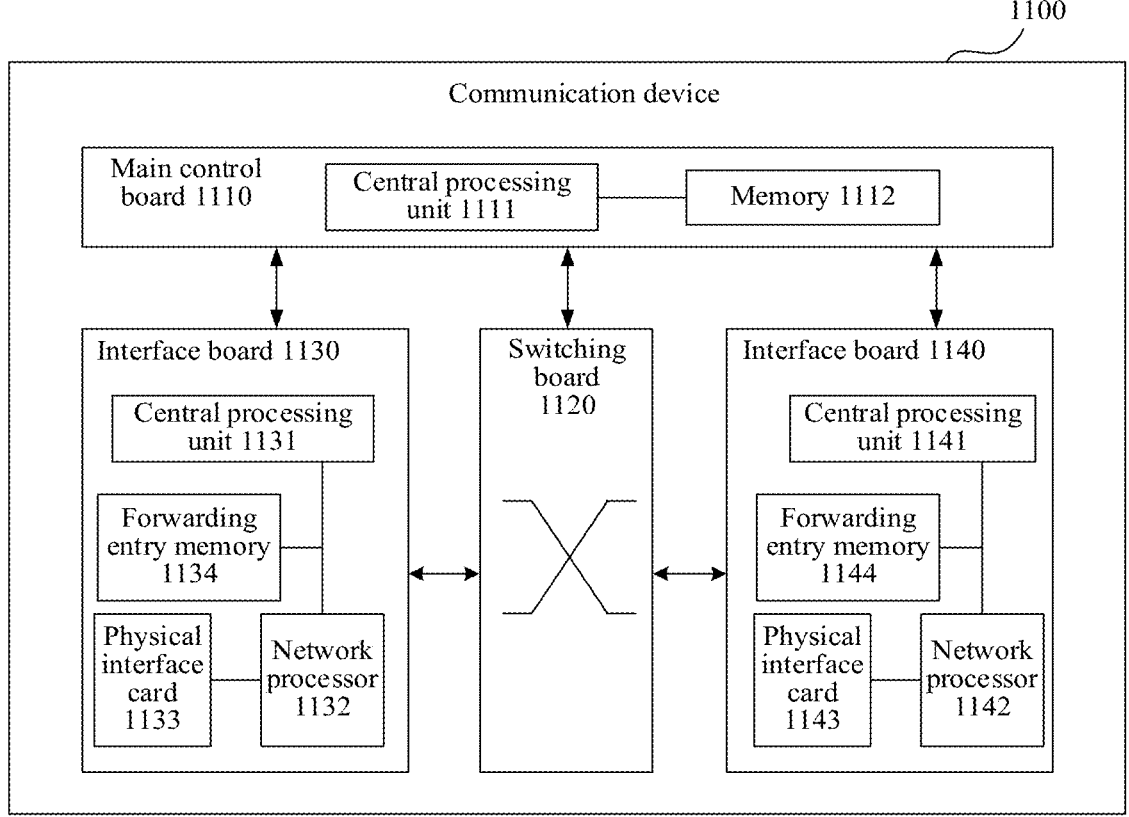
FIG. 11 is a schematic diagram of a structure of another communication device according to an embodiment of this application.

FIG. 11 is a schematic diagram of a structure of another communication device 1100 according to an embodiment of this application. For example, the communication device may be the first device, the second device, or the third device in the method embodiment, or may be implemented by the device of the apparatus 800 in the embodiment shown in FIG. 8, or may be implemented by the device of the apparatus 900 in the embodiment shown in FIG. 9.

The communication device 1100 includes a main control board 1110 and an interface board 1130.

The main control board 1110 is also referred to as a main processing unit (MPU) or a route processor card. The main control board 1110 controls and manages components in the communication device 1100, including functions such as routing calculation, device management, device maintenance, and protocol processing. The main control board 1110 includes a central processing unit 1111 and a memory 1112.

The interface board 1130 is also referred to as a line processing unit (LPU), a line card, or a service board. The interface board 1130 is configured to provide various service interfaces, and forward a data packet. The service interface includes, but is not limited to, an Ethernet interface, a Packet over Synchronous Optical Networking (SONET)/Synchronous Digital Hierarchy (SDH) (POS) interface, and the like. The Ethernet interface is, for example, a Flexible Ethernet (FlexE) service interface (or FlexE clients). The interface board 1130 includes a central processing unit 1131, a network processor 1132, a forwarding entry memory 1134, and a physical interface card (PIC) 1133.

The central processing unit 1131 on the interface board 1130 is configured to control and manage the interface board 1130, and communicate with the central processing unit 1111 on the main control board 1110.

The network processor 1132 is configured to implement packet forwarding processing. A form of the network processor 1132 may be a forwarding chip. Further, processing on an uplink packet includes processing at a packet ingress interface and forwarding table lookup, and processing on a downlink packet includes forwarding table lookup and the like.

The physical interface card 1133 is configured to implement a physical layer interconnection function. Original traffic enters the interface board 1130 from the physical interface card, and a processed packet is sent from the physical interface card 1133. The physical interface card 1133 includes at least one physical interface. The physical interface is also referred to as a physical port. The physical interface card 1133, also referred to as a subcard, may be installed on the interface board 1130, and is responsible for converting an optical/electrical signal into a packet, performing validity check on the packet, and forwarding the packet to the network processor 1132 for processing. In some embodiments, the central processing unit 1131 of the interface board 1103 may alternatively perform a function of the network processor 1132, for example, implement software forwarding based on a general-purpose CPU. Therefore, the network processor 1132 is not necessary in the physical interface card 1133.

Optionally, the communication device 1100 includes a plurality of interface boards. For example, the communication device 1100 further includes an interface board 1140. The interface board 1140 includes a central processing unit 1141, a network processor 1142, a forwarding entry memory 1144, and a physical interface card 1143.

Optionally, the communication device 1100 further includes a switching board 1120. The switching board 1120 may also be referred to as a switch fabric unit (SFU). When the communication device has a plurality of interface boards 1130, the switching board 1120 is configured to complete data exchange between the interface boards. For example, the interface board 1130 and the interface board 1140 may communicate with each other through the switching board 1120.

The main control board 1110 is coupled to the interface board 1130. For example, the main control board 1110, the interface board 1130 and the interface board 1140, and the switching board 1120 are connected to a system backboard through a system bus for interworking. In a possible implementation, an inter-process communication (IPC) channel is established between the main control board 1110 and the interface board 1130, and the main control board 1110 and the interface board 1130 communicate with each other through the IPC channel.

Logically, the communication device 1100 includes a control plane and a forwarding plane. The control plane includes the main control board 1110 and the central processing unit 1131. The forwarding plane includes components used for forwarding, for example, the forwarding entry memory 1134, the physical interface card 1133, and the network processor 1132. The control plane performs functions such as routing, generating a forwarding table, processing signaling and a protocol packet, and configuring and maintaining a device status. The control plane delivers the generated forwarding table to the forwarding plane. On the forwarding plane, the network processor 1132 looks up the forwarding table delivered by the control plane to forward a packet received by the physical interface card 1133. The forwarding table delivered by the control plane may be stored in the forwarding entry memory 1134. In some embodiments, the control plane and the forwarding plane may be completely separated, and are not on a same device.

It should be understood that the sending unit and the receiving unit in the embodiment shown in FIG. 8 may be different physical interface cards. For example, the receiving unit 801 is equivalent to the physical interface card 1133, and the sending unit 804 is equivalent to the physical interface card 1133. The determining unit 802, the generation unit 803, or the like in the apparatus 800 may be equivalent to one or more of the central processing unit 1111, the central processing unit 1131, and the central processing unit 1141 in the communication device 1100.

It can be understood that operations performed on the interface board 1140 are consistent with operations performed on the interface board 1130 in this embodiment of this application. For brevity, details are not described again. It should be understood that the communication device 1100 in this embodiment may correspond to the address request device or address allocation in the foregoing method embodiments. The main control board 1110, the interface board 1130, and/or the interface board 1140 in the communication device 1100 may implement functions and/or various steps implemented by the first device, the second device, or the third device in the foregoing method embodiments. For brevity, details are not described herein again.

It can be understood that there may be one or more main control boards. When there are a plurality of main control boards, the main control boards may include an active main control board and a standby main control board. There may be one or more interface boards. A stronger data processing capability of the communication device indicates a larger quantity of provided interface boards. There may also be one or more physical interface cards on the interface board. There may be no switching board or one or more switching boards. When there are a plurality of switching boards, load balancing and redundancy backup may be implemented together. In a centralized forwarding architecture, the communication device may not need a switching board, and the interface board undertakes a service data processing function of an entire system. In a distributed forwarding architecture, the communication device may have at least one switching board, and data is exchanged between a plurality of interface boards through the switching board, to provide a capability of exchanging and processing a large capacity of data. Therefore, a data access and processing capability of the communication device in the distributed architecture is greater than the device in the centralized architecture. Optionally, a form of the communication device may alternatively be in a form in which there is only one card. In an example, there is no switching board, and functions of the interface board and the main control board are integrated on the card. In this case, the central processing unit on the interface board and the central processing unit on the main control board may be combined into one central processing unit on the card, to perform functions obtained after the two central processing units are combined. The device in this form (for example, a communication device such as a low-end switch or a router) has a low data exchange and processing capability. A specific architecture that is to be used depends on a specific networking deployment scenario.

In some possible embodiments, the first device, the second device, or the third device may be implemented as a virtualized device. For example, the virtualized device may be a virtual machine (VM) on which a program having a packet sending function is run, and the virtual machine is deployed on a hardware device (for example, a physical server). The virtual machine is a complete software-simulated computer system that has complete hardware system functions and that runs in an entirely isolated environment. The virtual machine may be configured as the first device and the second device. For example, the first device and the second device may be implemented based on a general-purpose physical server in combination with a network functions virtualization (NFV) technology. The first device and the second device are virtual hosts, virtual routers, or virtual switches. A person skilled in the art may virtualize, on a general-purpose physical server, the first device, the second device, or the third device that has the foregoing functions by referring to this application and with reference to the NFV technology. Details are not described herein again.

It should be understood that the communication devices in the foregoing product forms have any function of the first device, the second device, or the third device in the foregoing method embodiments, and details are not described herein again.

An embodiment of this application further provides a chip, including a processor and an interface circuit. The interface circuit is configured to receive instructions and transmit the instructions to the processor. The processor may be, for example, a specific implementation form of the apparatus 800 shown in FIG. 8, and may be configured to perform the foregoing address prefix obtaining method. The processor is coupled to a memory. The memory is configured to store a program or instructions. When the processor executes the program or the instructions, the chip system is enabled to implement the method in any one of the foregoing method embodiments.

Optionally, there may be one or more processors in the chip system. The processor may be implemented by hardware, or may be implemented by software. When the processor is implemented by the hardware, the processor may be a logic circuit, an integrated circuit, or the like. When the processor is implemented by the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory (ROM). The memory and the processor may be integrated into a same chip, or may be separately disposed on different chips. A type of the memory and a manner of disposing the memory and the processor are not limited in this application.

For example, the chip system may be an FPGA, an ASIC, a system on a chip (SoC), a CPU, a NP, a digital signal processor (DSP), a microcontroller unit (MCU), a PLD, or another integrated chip.

An embodiment of this application further provides a packet processing system. The system includes a first device and a second device. The second device is configured to send a first packet to the first device, where the first packet includes a first SRH, and the first device is configured to perform the packet processing method in FIG. 3.

In a possible implementation, the first device is further configured to perform the segment identifier releasing method in FIG. 7.

An embodiment of this application further provides a computer-readable storage medium, including instructions or a computer program. When the instructions or the computer program is run on a computer, the computer is enabled to perform the packet processing method or the segment identifier releasing method provided in the foregoing embodiments.

An embodiment of this application further provides a computer program product including instructions or a computer program. When the computer program product is run on a computer, the computer is enabled to perform the packet processing method or the segment identifier releasing method provided in the foregoing embodiments.

An embodiment of this application further provides a chip, including a memory and a processor. The memory is configured to store instructions or program code. The processor is configured to invoke the instructions or the program code from the memory and run the instructions or the program code, to execute the packet processing method, or the processor executes the segment identifier releasing method.

An embodiment of this application further provides a chip. The chip includes a processor but does not include a memory. The processor is configured to read and execute instructions or program code stored in a memory outside the chip. When the instructions or the program code is executed, the processor performs the packet processing method, or the processor performs the segment identifier releasing method.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way is interchangeable in proper circumstances, so that embodiments described herein can be implemented in another order than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

It may be clearly understood by a person skilled in the art that, for convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical service division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may be or may not be physically separate, and parts displayed as units may be or may not be physical units, in other words, may be located in one position, or may be distributed on a plurality of network units. Some or all of the units may be selected based on actual requirements to achieve the objectives of the solutions of embodiments.

In addition, service units in embodiments of this application may be integrated into one processing unit, each of the units may exist alone physically, or two or more units may be integrated into one unit. The integrated unit may be implemented in a form of hardware, or may be implemented in a form of a software service unit.

When the integrated unit is implemented in the form of a software service unit and sold or used as an independent product, the integrated unit may be stored in a computer-readable storage medium. Based on such an understanding, the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The storage medium includes any medium that can store program code, such as a Universal Serial Bus (USB) flash drive, a removable hard disk, a ROM, a RAM, a magnetic disk, or an optical disc.

A person skilled in the art should be aware that in the foregoing one or more examples, services described in the present disclosure may be implemented by hardware, software, firmware, or any combination thereof. When implemented by software, the services may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose or a dedicated computer.

The foregoing specific implementations further describe the objectives, technical solutions, and beneficial effects of the present disclosure in detail. It should be understood that the foregoing descriptions are merely specific implementations of the present disclosure.

In conclusion, the foregoing embodiments are merely intended for describing the technical solutions of this application, but not for limiting this application. Although this application is described in detail with reference to the foregoing embodiments, a person of ordinary skilled in the art should understand that modifications may still be made to the technical solutions described in the foregoing embodiments or equivalent replacements may be made to some technical features, and such modifications or replacements do not cause the essence of the corresponding technical solutions to depart from the scope of embodiments of this application.

What is claimed is:

1. A method implemented by a first device, wherein the method comprises:
    receiving, from a second device, a first packet comprising a first segment routing header (SRH) and a first segment identifier corresponding to the first device, wherein the first segment identifier is either of a first endpoint bound to a segment routing Internet Protocol version 6 (SRv6) policy delete on demand End.B6.Dod type or a second endpoint bound to a segment routing with Multiprotocol Label Switching (MPLS) (SR-MPLS) policy delete on demand End.BM.Dod type;

performing, on the first packet in response to the first packet, a first operation of deleting the first SRH to generate a modified first packet;

performing an encapsulation operation on the modified first packet to generate a second packet; and sending the second packet.

2. The method of claim 1, wherein performing the first operation further comprises further performing, on the first packet in response to a segment left (SL) in the first SRH being equal to 1 or an updated SL in the first SRH being equal to 0, the first operation on the first packet.

3. The method of claim 1, wherein the first segment identifier is a binding segment identifier.

4. The method of claim 1, wherein performing the encapsulation operation comprises encapsulating a first packet header into the modified first packet to generate the second packet.

5. The method of claim 4, wherein the first packet header is an Internet Protocol version 6 (IPv6) basic header, an IPv6 header comprising a second SRH, or a Multiprotocol Label Switching (MPLS) header.

6. The method of claim 4, wherein the first packet header comprises path information, and wherein the path information indicates a transmission path of the second packet.

7. The method of claim 6, wherein the path information corresponds to the first segment identifier.

8. The method of claim 6, wherein the first SRH comprises a second segment identifier, wherein the second segment identifier indicates a next segment for transmitting the first packet, and wherein the path information corresponds to the second segment identifier.

9. A first device comprising:

a memory configured to store instructions; and one or more processors coupled to the memory and configured to execute the instructions to cause the first device to:

receive, from a second device, a first packet comprising a first segment routing header (SRH) and a first segment identifier corresponding to the first device, wherein the first segment identifier is either of a first endpoint bound to a segment routing Internet Protocol version 6 (SRv6) policy delete on demand End.B6.Dod type or a second endpoint bound to a segment routing with Multiprotocol Label Switching (MPLS) (SR-MPLS) policy delete on demand End.BM.Dod type;

perform, on the first packet in response to the first packet, a first operation of deleting the first SRH to generate a modified first packet;

perform an encapsulation operation on the modified first packet to generate a second packet; and send the second packet.

10. The first device of claim 9, wherein the one or more processors are further configured to further perform, on the first packet in response to a segment left (SL) being equal to 1 or an updated SL being equal to 0, the first operation.

11. The first device of claim 9, wherein a type of the first segment identifier is a binding segment identifier.

12. The first device of claim 9, wherein the one or more processors are further configured to:

encapsulate a first packet header into the first packet to generate the second packet.

13. The first device of claim 12, wherein the first packet header is an Internet Protocol version 6 (IPv6) basic header, an IPv6 header comprising a second SRH, or a Multiprotocol Label Switching (MPLS) header.

14. The first device of claim 12, wherein the first packet header comprises path information, and wherein the path information indicates a transmission path of the second packet.

15. The first device of claim 14, wherein the path information corresponds to the first segment identifier.

16. A computer program product comprising computer-executable instructions that are stored on a non-transitory computer-readable storage medium and that, when executed by one or more processors, cause a first device to:

receive, from a second device, a first packet comprising a first segment routing header (SRH) and a first segment identifier corresponding to the first device, wherein the first segment identifier is either of a first endpoint bound to a segment routing Internet Protocol version 6 (SRv6) policy delete on demand End.B6.Dod type or a second endpoint bound to a segment routing with Multiprotocol Label Switching (MPLS) (SR-MPLS) policy delete on demand End.BM.Dod type;

perform, on the first packet in response to the first packet, a first operation of deleting the first SRH to generate a modified first packet;

perform an encapsulation operation on the modified first packet to generate a second packet; and send the second packet.

17. The computer program product of claim 16, wherein the computer-executable instructions that when executed by the one or more processors cause the first device to perform the first operation by further performing, on the first packet in response to a segment left (SL) being equal to 1 or an updated SL being equal to 0, the first operation.

18. The computer program product of claim 16, wherein a type of the first segment identifier is a binding segment identifier.

19. The computer program product of claim 16, wherein the computer-executable instructions that when executed by the one or more processors cause the first device to perform the encapsulation operation by encapsulating a first packet header into the modified first packet to generate the second packet.

20. The computer program product of claim 19, wherein the first packet header is an Internet Protocol version 6 (IPv6) basic header, an IPv6 header comprising a second SRH, or a Multiprotocol Label Switching (MPLS) header.

\*      \*      \*      \*      \*